(12) United States Patent
DeLaVergne

(10) Patent No.: US 7,549,571 B2
(45) Date of Patent: Jun. 23, 2009

(54) ENVIRONMENTALLY FRIENDLY REUSABLE ENVELOPE STRUCTURES

(75) Inventor: Carol A. DeLaVergne, Stillwater, MN (US)

(73) Assignee: ecoEnvelopes, LLC, Stillwater, MN (US)

( * ) Notice: Subject to any disclaimer, the term of this patent is extended or adjusted under 35 U.S.C. 154(b) by 277 days.

(21) Appl. No.: 10/632,489

(22) Filed: Jul. 31, 2003

(65) Prior Publication Data

US 2004/0050918 A1    Mar. 18, 2004

Related U.S. Application Data

(60) Provisional application No. 60/411,647, filed on Sep. 18, 2002.

(51) Int. Cl.
*B65D 27/06* (2006.01)

(52) U.S. Cl. .................................. 229/305; 229/303

(58) Field of Classification Search ............... 229/305, 229/300–301, 303, 71, 304, 70
See application file for complete search history.

(56) References Cited

U.S. PATENT DOCUMENTS

| 192,522 | A | | 6/1877 | Marshall |
| 759,382 | A | * | 5/1904 | Klugh ........................ 229/305 |
| 886,449 | A | | 5/1908 | West |
| 932,715 | A | | 8/1909 | Morrison |
| 1,145,935 | A | | 7/1915 | Steinke |
| 1,173,869 | A | | 2/1916 | Rougeux |
| 1,187,258 | A | | 6/1916 | Carr et al. |
| 1,245,447 | A | * | 11/1917 | Felenchak .................... 229/70 |
| 1,438,122 | A | | 12/1922 | McCoy |
| 1,953,192 | A | | 4/1934 | Rossiter |
| 1,957,704 | A | * | 5/1934 | Drachman .................. 229/305 |
| 1,960,054 | A | | 5/1934 | Johnson |
| 1,988,908 | A | * | 1/1935 | MacKinnon ................. 229/71 |
| 2,340,700 | A | | 2/1944 | Sawdon |
| 2,350,100 | A | | 5/1944 | Deutschmeister et al. |
| 2,941,711 | A | | 6/1960 | Biek |
| 3,062,431 | A | | 11/1962 | Rabenold |
| 3,086,695 | A | | 4/1963 | Lillibridge |
| 3,111,257 | A | | 11/1963 | Peach |
| 3,152,751 | A | | 10/1964 | Hiersteiner |
| 3,227,360 | A | | 1/1966 | Krueger |
| 3,276,669 | A | | 10/1966 | Vilutis |
| 3,380,648 | A | | 4/1968 | Lyra |
| 3,411,699 | A | * | 11/1968 | Pine et al. ..................... 229/69 |
| 3,498,528 | A | | 3/1970 | Klein |
| 3,537,637 | A | | 11/1970 | Hiersteiner |
| 3,545,669 | A | * | 12/1970 | Kinkade et al. ............. 229/300 |
| 3,693,869 | A | | 9/1972 | Eaves, Jr. |

(Continued)

FOREIGN PATENT DOCUMENTS

CA    2075214    12/1993

(Continued)

*Primary Examiner*—Jes F Pascua
(74) *Attorney, Agent, or Firm*—Kagan Binder, PLLC

(57) ABSTRACT

The present invention provides reusable envelope structures, kits for forming reusable envelope structures, and methods of using envelopes formed from such structures and kits. Reusable envelope structures can be formed and kits can be formed for converting existing envelopes to reusable envelopes in accordance with the present invention. As such, envelopes may advantageously be provided that can be reused one or more times.

18 Claims, 23 Drawing Sheets

U.S. PATENT DOCUMENTS

| | | | |
|---|---|---|---|
| 3,747,837 A | 7/1973 | Wilson | |
| 3,874,582 A | 4/1975 | Wang | |
| 3,982,689 A | 9/1976 | Retrum | |
| 4,157,759 A | 6/1979 | Dicker | |
| 4,159,129 A | 6/1979 | Lockhart | |
| 4,180,168 A | 12/1979 | Hiersteiner | |
| 4,190,161 A | 2/1980 | Gendron | |
| 4,190,162 A | 2/1980 | Buescher | |
| 4,194,631 A | 3/1980 | Rangan | |
| 4,245,775 A | 1/1981 | Conn | |
| 4,288,028 A * | 9/1981 | Diaz | 229/302 |
| 4,308,987 A | 1/1982 | Solomon | |
| 4,332,346 A | 6/1982 | Kronman | |
| 4,354,631 A | 10/1982 | Stevenson | |
| 4,379,573 A | 4/1983 | Lomeli et al. | |
| 4,382,539 A | 5/1983 | Kronman | |
| 4,403,696 A | 9/1983 | Newell | |
| 4,436,202 A | 3/1984 | Berkley | |
| 4,565,317 A | 1/1986 | Kranz | |
| 4,602,736 A | 7/1986 | Barr | |
| 4,640,030 A | 2/1987 | Wood et al. | |
| 4,688,715 A | 8/1987 | Barr | |
| 4,690,322 A | 9/1987 | Burns | |
| 4,715,531 A | 12/1987 | Stewart et al. | |
| 4,775,095 A | 10/1988 | Emmott | |
| 4,778,100 A | 10/1988 | McGuire et al. | |
| 4,778,101 A | 10/1988 | Paquin | |
| 4,821,439 A | 4/1989 | Wilck | |
| 4,896,823 A | 1/1990 | Taylor | |
| 4,899,926 A | 2/1990 | Spaulding | |
| 4,917,287 A | 4/1990 | Watson | |
| 4,927,072 A | 5/1990 | Jenkins et al. | |
| 4,934,536 A | 6/1990 | Mills | |
| 4,944,449 A | 7/1990 | Schmidt | |
| 4,945,218 A | 7/1990 | Talbott | |
| 4,960,237 A | 10/1990 | Bendel | |
| 4,981,251 A | 1/1991 | Jenkins et al. | |
| 4,993,624 A | 2/1991 | Schlich | |
| 5,024,374 A | 6/1991 | Ashby | |
| 5,025,980 A | 6/1991 | Blackman | |
| 5,039,000 A | 8/1991 | Ashby | |
| 5,040,720 A | 8/1991 | Pennock | |
| 5,052,613 A * | 10/1991 | Lin | 229/303 |
| 5,071,167 A | 12/1991 | O'Brien | |
| 5,071,399 A | 12/1991 | Ashby | |
| 5,104,036 A | 4/1992 | Rutkowski et al. | |
| 5,110,043 A | 5/1992 | Ashby | |
| 5,118,030 A | 6/1992 | McNamara et al. | |
| 5,118,031 A | 6/1992 | Tighe | |
| 5,125,562 A | 6/1992 | Bendel | |
| 5,163,612 A | 11/1992 | Ashby | |
| 5,197,663 A | 3/1993 | Stude | |
| 5,209,698 A | 5/1993 | Dolan | |
| 5,213,258 A * | 5/1993 | Kim | 229/305 |
| 5,224,647 A | 7/1993 | Yanow | |
| 5,232,150 A | 8/1993 | Solomons | |
| 5,251,810 A | 10/1993 | Kim | |
| 5,253,803 A | 10/1993 | Chess | |
| 5,271,553 A | 12/1993 | Kim | |
| 5,277,362 A | 1/1994 | Wilson | |
| 5,282,568 A | 2/1994 | File | |
| 5,292,062 A | 3/1994 | Chess | |
| 5,299,979 A | 4/1994 | Ballard | |
| 5,307,989 A | 5/1994 | Dyer | |
| 5,324,927 A | 6/1994 | Williams | |
| 5,333,909 A | 8/1994 | Hedge, Jr. | |
| 5,383,686 A | 1/1995 | Laurash | |
| 5,400,957 A | 3/1995 | Stude | |
| 5,431,337 A | 7/1995 | Bell | |
| 5,487,566 A | 1/1996 | Hedge, Jr. | |
| 5,501,393 A | 3/1996 | Walz | |
| 5,503,328 A | 4/1996 | Roccaforte et al. | |
| 5,510,608 A | 4/1996 | Williams | |
| 5,514,863 A | 5/1996 | Williams | |
| 5,520,990 A | 5/1996 | Rotermund | |
| 5,547,227 A | 8/1996 | Laurash et al. | |
| 5,570,835 A | 11/1996 | Sung et al. | |
| 5,626,286 A | 5/1997 | Petkovsek | |
| 5,626,370 A | 5/1997 | Petkovsek | |
| 5,662,420 A | 9/1997 | Sinda et al. | |
| 5,687,904 A | 11/1997 | Potter | |
| 5,704,543 A * | 1/1998 | Pollanen | 229/303 |
| 5,713,511 A | 2/1998 | Diamond | |
| 5,823,423 A | 10/1998 | Murray | |
| 5,826,787 A | 10/1998 | Turner | |
| 5,875,964 A | 3/1999 | Pham | |
| 5,887,780 A | 3/1999 | Popat et al. | |
| 5,887,904 A | 3/1999 | Ketkovsek | |
| 5,929,415 A | 7/1999 | Berson | |
| 5,950,916 A | 9/1999 | Santangelo | |
| 6,053,855 A | 4/2000 | Stenner | |
| 6,129,269 A | 10/2000 | Tait | |
| 6,155,481 A * | 12/2000 | Rawlings | 229/300 |
| 6,170,879 B1 | 1/2001 | Rawlings | |
| 6,196,447 B1 | 3/2001 | Purcell et al. | |
| 6,220,504 B1 | 4/2001 | Flynn et al. | |
| 6,223,977 B1 | 5/2001 | Hill | |
| 6,237,844 B1 | 5/2001 | Purcell | |
| 6,254,138 B1 | 7/2001 | Rawlings et al. | |
| 6,296,179 B1 | 10/2001 | Wortmann | |
| D451,131 S | 11/2001 | Chegwe-Akigbe | |
| 6,343,736 B1 | 2/2002 | Kim | |
| 6,435,404 B1 | 8/2002 | Feick | |
| 6,612,484 B2 * | 9/2003 | Rawlings et al. | 229/305 |
| 6,725,587 B2 | 4/2004 | Collins | |
| 6,983,875 B2 | 1/2006 | Emmott | |
| 2002/0008135 A1 | 1/2002 | Kim | |
| 2002/0023948 A1 | 2/2002 | Gillespie, IV | |
| 2002/0030093 A1 | 3/2002 | Kim | |
| 2002/0130169 A1 | 9/2002 | Purcell | |
| 2003/0015581 A1 | 1/2003 | Purcell | |
| 2004/0050918 A1 | 3/2004 | DeLaVergne | |
| 2005/0045707 A1 | 3/2005 | Stude | |
| 2005/0184140 A1 | 8/2005 | DeLaVergne | |
| 2006/0113367 A1 | 6/2006 | Emmott | |
| 2006/0208053 A1 | 9/2006 | Emmott | |
| 2006/0219769 A1 | 10/2006 | DeLaVergne | |

FOREIGN PATENT DOCUMENTS

| | | |
|---|---|---|
| CA | 2138361 | 8/1999 |
| EP | 0 230 796 | 8/1987 |
| EP | 0 611 056 | 8/1994 |
| JP | 6-72446 | 3/1994 |
| JP | 2001-122287 | 5/2001 |
| WO | WO93/19991 | 10/1993 |
| WO | WO 93/19991 * | 10/1993 |
| WO | WO96/21598 | 7/1996 |
| WO | WO00/10885 | 3/2000 |
| WO | WO2004/076296 | 9/2004 |

* cited by examiner

ENVIRONMENTALLY FRIENDLY REUSABLE ENVELOPE STRUCTURES

CROSS REFERENCE TO RELATED APPLICATION

This application claims the benefit of U.S. Provisional Application Ser. No. 60/411,647, filed Sep. 18, 2002, entitled "ENVIRONMENTALLY FRIENDLY REUSABLE ENVELOPE STRUCTURES," which application is incorporated herein by reference in its entirety.

FIELD OF THE INVENTION

The present invention is directed to reusable envelope structures, kits for forming reusable envelopes, and methods of use thereof. In particular, the present invention is directed to reusable envelope structures and kits for forming reusable envelopes, which preferably comprise environmentally friendly structures, materials, and/or methods of use.

BACKGROUND OF THE INVENTION

Many types of envelope structures are, in general, well known. A common disadvantage of many envelope structures is that they can only be used once and are then usually discarded afterwards thereby creating unnecessary waste after a single use. Some envelopes fail to be used even once before being discarded. Moreover, it is common for an otherwise unused envelope structure to be discarded because it has been preaddressed for a particular recipient. For example, certain envelope structures are frequently utilized for mailing invoices and the like. A second envelope, which is often preaddressed and sometimes provided with postage, is usually included with the invoice for returning the invoice to the sender. In the case where the invoice is not returned, such as where a payment or correspondence is made electronically, the second preaddressed envelope is usually discarded. This practice, although not uncommon, is unfortunately wasteful, especially in large volumes. Thus, easily reusable envelope structures are desirable.

Envelopes have been developed that utilize a single structure to form primary and return envelopes such as are described in U.S. Pat. No. 4,194,631 to Rangan and U.S. Pat. No. 4,715,531 to Stewart et al. These envelopes are directed to small envelopes such as conventional #10 envelopes. Envelopes of this type are convertible from a primary to a return envelope. That is, tearing and folding steps are used to convert a received envelope to an envelope that can be returned to the sender or forwarded to another party. Typically, these structures are quite complex and somewhat costly to produce. Thus, reusable envelopes in general have been limited small envelopes and large established markets for their use.

Additionally, known reusable envelope structures can be somewhat difficult to utilize because of a requirement for performing complex operations in order to manipulate the envelope. That is, a cumbersome sequence of steps must be followed in order to convert the envelope. Moreover, many envelopes of this type commonly include tags, glue patches, or loose edges being left on the envelope, which can interfere with machine sorting equipment, especially on the return trip. As such, easy to use and cost effective reusable envelope structures are desirable, especially for large envelopes.

SUMMARY OF THE INVENTION

The present invention provides reusable envelope structures and methods of use thereof. In preferred aspects, the present invention provides novel envelope structures in which a single envelope structure can provide multiple uses.

The present invention provides reusable envelope structures, kits for forming reusable envelope structures, and methods of using envelopes formed from such structures and kits. Preferably, such envelopes are formed from environmentally friendly materials. Such environmentally friendly materials broadly include, but are not limited to, recycled papers, plant based plastics, and earth friendly glues and adhesives. It has now been discovered that envelopes can be economically formed and used in a way such that waste can be reduced and natural resources conserved. That is, reusable envelope structures can be formed and kits can be formed for converting existing envelopes to reusable envelopes in accordance with the present invention. As such, envelopes may advantageously be provided that can be reused one or more times, which saves time, money, and conserves natural resources. Further, utilizing environmentally friendly materials in the manufacture of such reusable envelopes may allow certain properties of the environmentally friendly materials to be exploited in ways particularly advantageous to individuals and businesses that desire reusable envelopes.

It is believed that any envelope, mailing device, or mailing container can benefit from the application of the inventive concept of the present invention. As a result, the choice of the type of envelope in which to apply the concept is not particularly limited. It is believed, however, that certain aspects of the inventive concept will prove particularly advantageous to large envelopes. Accordingly, envelopes can easily be manufacture to be reused. Moreover, this helps to reduce landfill waste and save natural resources.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this application, illustrate several aspects of the invention and together with the description of the embodiments serve to explain the principles of the invention. A brief description of the drawings is as follows.

DETAILED DESCRIPTION

The embodiments of the present invention described below are not intended to be exhaustive or to limit the invention to the particular embodiments disclosed in the following detailed description. Rather, the embodiments are described so that others can understand the principles and practices of the present invention.

Figure 1:
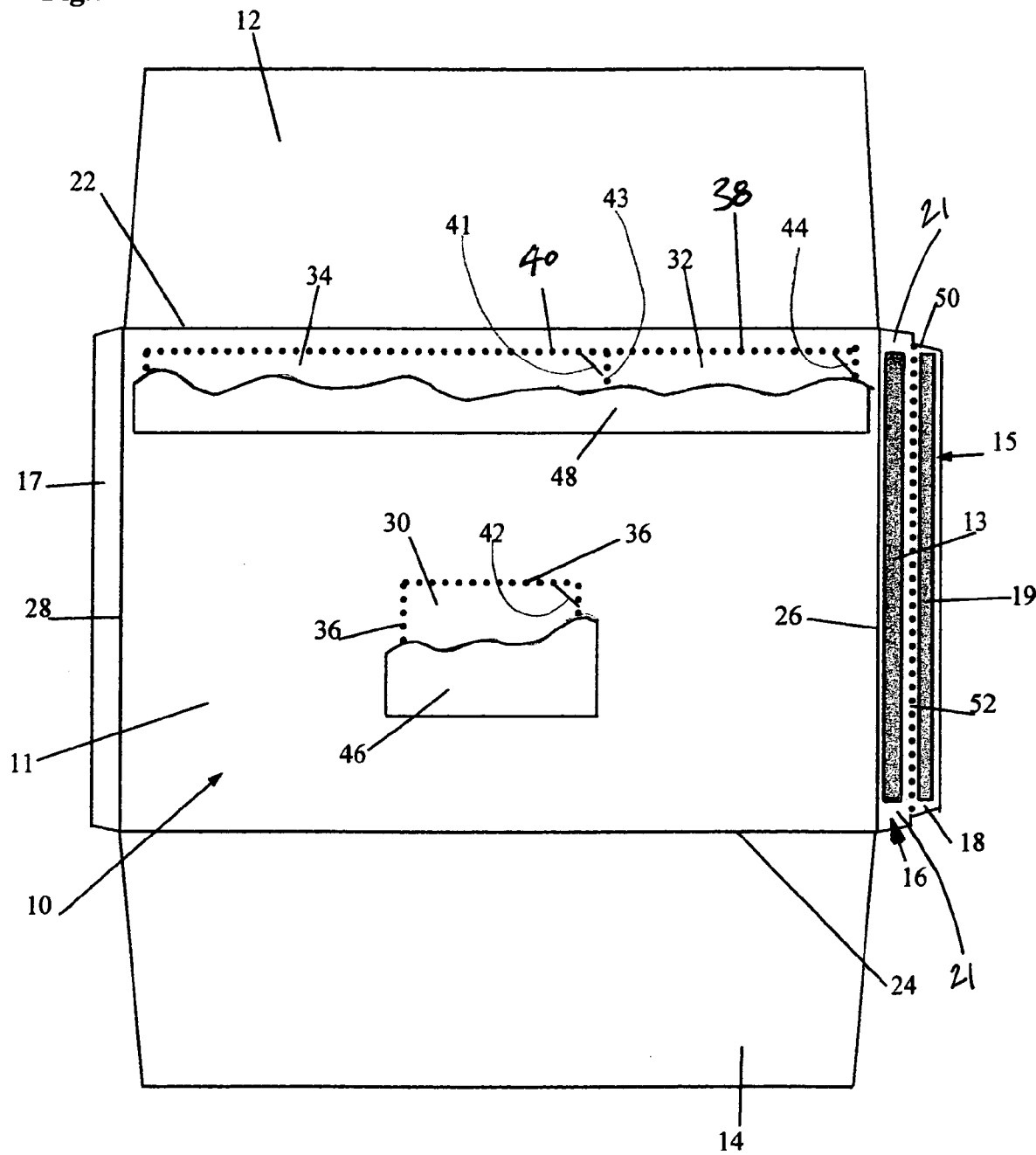
FIG. 1 is an inside view of an envelope blank that can be made in accordance with the present invention showing, in particular, plural tear off portions thereof.

An exemplary envelope blank 10 in accordance with the present invention is shown in FIG. 1. Preferably, the envelope blank 10 is formed from an environmentally friendly material such as tree-free paper, recycled paper, plant based plastics, and the like but can alternatively be made from any material. That is, the envelope blank 10 may be formed from any conventional materials such as, but not limited to, paper, plastic, cloth, cardboard, cellophane, and combinations thereof.

Figure 2:
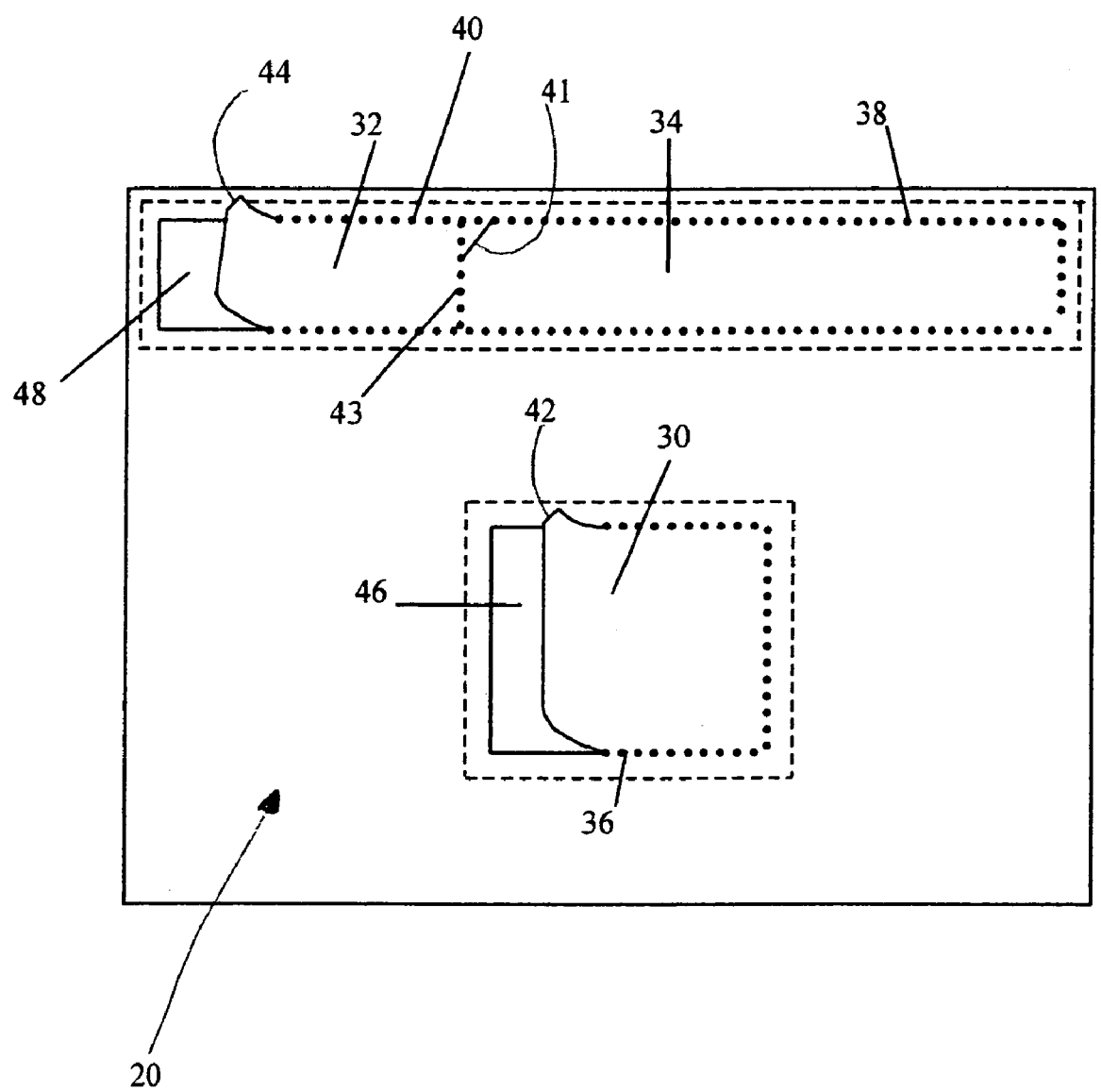
FIG. 2 is a front view of a reusable envelope that can be made in accordance with the present invention from the envelope blank of FIG. 1 and showing the tear off portions thereof partially removed.

Generally, the envelope blank 10 comprises panels 11, 12, 14, and 17, which are capable of forming an envelope structure having a body and a sealing flap such as the envelope 20 illustrated in FIG. 2 by appropriate folding. Preferably the envelope 20 is a large envelope such as 6" by 9" or 10" by 13" envelopes, for example. The envelope 20 may be any size envelope, however, such as a #10 envelope or other conventional envelope. Additionally, the envelope blank 10 preferably includes panel or flap 15, which is preferably foldable along line 26 and which can be used as a closure flap for the envelope 20. As shown, the panel 11 can form a front face of the envelope 20. The panels 12 and 14 are preferably foldable along lines 22 and 24 respectively with respect to the panel 11 and can form a rear face of the envelope 20. The panel 17 is, as shown, foldable along line 28 with respect to the panel 11 so as to complete the envelope structure shown in FIG. 2. In a preferred aspect of the present invention an environmentally friendly adhesive such as Ecostix™ available from Ecosynthetix of Lansing, Mich. may be used to form the envelope 20 by attaching the panels 12, 14, and 17 to each other. Alternatively, any suitable adhesive, known or developed, may be used in accordance with the principle of the present invention.

Further, as shown in FIGS. 1 and 2, the envelope blank 10 preferably includes a first removable portion 30, a second removable portion 32, and a third removable portion 34. Any of these removable or tear off portions can be used in accordance with the present invention, either alone or together. Additionally, panels 46 and 48 are preferably attached to the panel 11 as illustrated so as to form a structure behind removable portions 30, 32, and 34 with respect to the front of the envelope 20. Any number of panels may be used in place of panels 46 and 48. That is, a single panel may be used to form panels 46 and 48 or any number of plural panels may be used accordingly.

Preferably removable portions 30, 32, and 34 are defined by perforations 36, 38, and 40 respectively, which are at least partially cut through the panel 11 so as to form a line of weakness for easy detachment. Perforations 36, 38, and 40 are preferably formed at predetermined intervals such that removable portions 30, 32, and 34 remain intact and an integral part of panel 11 until portions 30, 32, and 40 are removed. Also, as shown, a perforation 43 separates the portions 32 and 34 so that the portions 32 and 34 can be independently removed with respect to each other if desired.

The pattern of perforations 36 around removable portion 30 may comprise any desired pattern including but not limited to oval, circle, triangle, square, rectangle, shapes representative of a business such as aircraft, trucks, trademarks, etc., and puzzle shapes. Perforations 38 and 40 around removable portion 32 and 34 define a rectangle as shown but may be any desired pattern including those described above. Varying widths and lengths as required by the size of the envelope and the needs of the return address and postage requirements may be used.

Perforations 36, 38, and 40 are preferably formed around portions 30, 32, and 34 to allow for the removal of portions 30, 32, and 34 from the face (panel 11) of the envelope. It is contemplated that any line of weakness may be formed in the panel 11 to define the removable portions 30, 32, and 34 so that the portions 30, 32, and 34 can be removed from the panel 11. Preferably, as shown, slits 41, 42, and 44 are positioned at a corner of the removable portions 34, 30, and 32 respectively to provide a means to remove portions 30, 32, and 34. Preferably, the slits 41, 42, and 44 are cut through the panel 11 as a single cut so as minimize interference with the processing equipment utilized by the post office. The slits 41, 42, and 44 may be located on any corner or at any location along the perforations. Further, multiple slits may be used on a removable portion. Alternatively or additionally tabs, strings, glued tabs, or flaps may be used. Also, it is contemplated that the perforations near a slit may be formed to be slightly weaker than the perforations that define the rest of a removable portion so that a removable portion can be more easily removed.

Removal of any of the portions 30, 32, and 34 reveals panels 46 and 48. By removing any of portions 30, 32, and 34 and exposing panels 46 and 48 a clean surface or a preprinted address, either return or recipient, or a postage mark may be provided thereby allowing the reuse of the envelope. The panels 46 and 48 may comprise blank, printed, cellophane window, or pocket structures. Any of the removable portions 30, 32, and 34, may further comprise an activatable adhesive or an adhesive with a removable liner applied to the back of at least a portion of the removable portions thereby permitting the portions to be reused as labels or the like on another or same envelope or package. In accordance with the present invention, panels 46 and 48 are preferably made from an earth friendly material such as recycled paper but may be formed from any material such as plastic, cloth, paper, and combinations thereof.

Still referring to FIG. 1, the panel 15, which is preferably used as a reusable sealing flap for the envelope 20, is shown in an exemplary embodiment. Panel 15 preferably comprises a first section 16 and a second section 18 separated by a boundary 52. The boundary 52 can be any line or region of weakness that can allow the sections 16 and 18 to be separated from each other to allow controlled opening and reclosure as described below. For example, the boundary may be a perforation or other release device or the like.

Preferably each of the sections 16 and 18 includes one or more respective adhesive regions (13 and 19, respectively) formed on at least a portion of each section 13 and 19. As shown, the adhesive regions 13 and 19 preferably extend along a length of the sections 16 and 18 but may be formed in any pattern or manner such that they can be used to secure the sealing flap 15 in accordance with the present invention as described below. For example, plural areas of adhesive, having any desired shape (regular, random, dots, lines, etc.), may be used as one or both of the adhesive regions 13 and 19.

Preferably, at least one of the adhesive regions 13 and 19 is spaced apart from the boundary 52. This facilitates independent sealing of either section 13 or 19 to the body of the envelope so that one of the sections can be reserved for sealing the envelope as described herein. In one preferred embodiment, both the adhesive region 13 and the adhesive region 19 are spaced apart from the boundary 52 as shown in FIG. 1. That is, the adhesive regions 13 and 19 are spaced apart from each other such that the boundary 52 is positioned generally between them.

Preferably, section 16 includes a tab 21 formed at an end of the section 16. More preferably, section 16 includes a tab 21 formed at each end of the section 16. The tab 21 preferably functions as a lifting tab that can be used to facilitate opening of the envelope when the sealing flap 15 is secured by the adhesive region 19. That is, the tab 21 generally makes it easier to initiate opening of the sealing flap along the boundary 52. For example, if the boundary 52 comprises a perforation or the like, the tab 21 may be lifted such that a tear may easily be initiated along the perforation to open the envelope.

The tab 21 may be formed, in one embodiment, by forming section 18 to be shorter than section 16 as illustrated in FIG. 1. Section 18 may be formed to be shorter than section 16 by including an indent 50 to form an access region indented at one or both ends of section 18. The indent preferably provides access to the tab 21. The indent 50 is preferably sized appropriately, depending on the envelope, so that the tab 21 can be accessed and that section 16 can easily be detached from section 18 when opening the envelope after being sealed by section 18 as described below. The indent 50 may be beveled, straight, curved, or any desired cut to form the indent.

Figure 3:
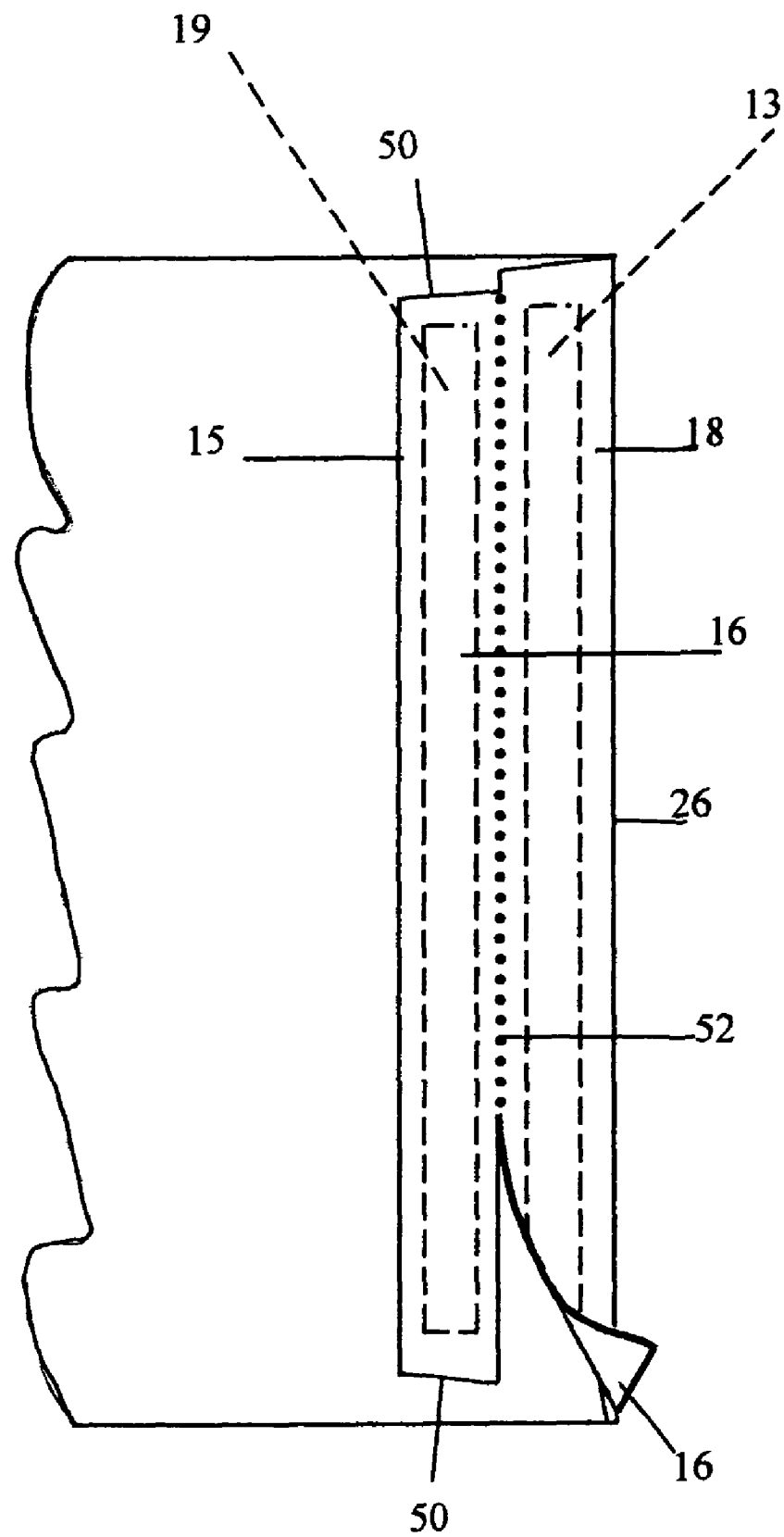
FIG. 3 is a top view of a reusable envelope closure that can be made in accordance with the present invention.

In a representative mode of use of the envelope, the envelope may be closed with seal flap 15, such as by using adhesive region 19 to secure the seal flap 15 to the envelope. Note that adhesive region 13 is not used for this closure and remains available for a subsequent sealing. Referring to FIG. 3, the envelope may be opened by lifting the tab 21, such that a tear can be formed along the length of boundary 52 (such as a perforation) until the section 16 is released. Section 18 thus preferably remains sealed to the envelope. The indent 50 is provided to allow easy access to section 16 thereby making it easy to separate section 16 from section 18 along boundary 52 by using the tab 21. Also, spacing the adhesive formed on one or both of sections 16 and 18 apart from the boundary 52 and apart from each other provides for easy opening of the envelope.

It is contemplated that the boundary 52 need not include a perforation or other actual line of weakness. That is, a boundary such as a perforation may not be needed. A suitable tool, such as a cutting tool may be used to separate the section 16 from section 18 when the adhesive region 19 is sealed to the envelope by controllably cutting between the adhesive regions. For example, the envelope may be sealed by adhesive region 19. A cutting tool, such as a scissors or the like, may be inserted to cut along the unsealed region between the adhesive regions 13 and 19 to open the envelope. Alternatively, a processing machine may be used for high volume applications. If desired, guidelines or markers may be printed or otherwise formed on the envelope to assist in cutting the sealing flap in the correct location. The perforation or other line of weakness is preferred, though, because it aids in opening the envelope.

The envelope may then be reused by activating adhesive 13 to reseal the envelope. It is contemplated that the flap 15 may comprise as many sections as desired in accordance with the function aspects described herein so that the envelope may be reused multiple times. Additionally, the envelope may include printed instructions for sealing, opening, and/or resealing the envelope if desired.

Figure 4:
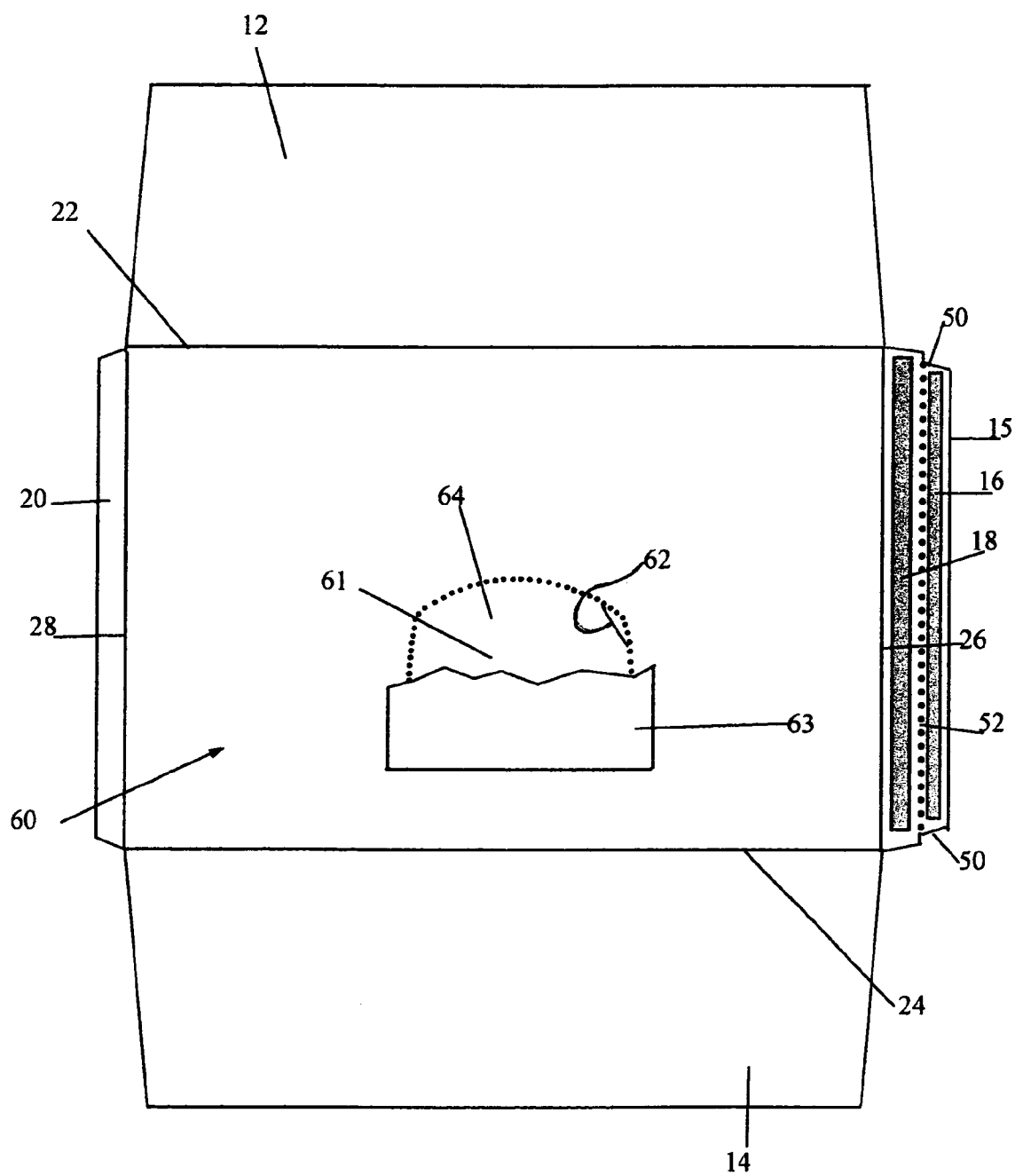
FIG. 4 is an inside view of an envelope blank that can be made in accordance with the present invention showing, in particular, an oval shaped tear off portion thereof.
Figure 5:
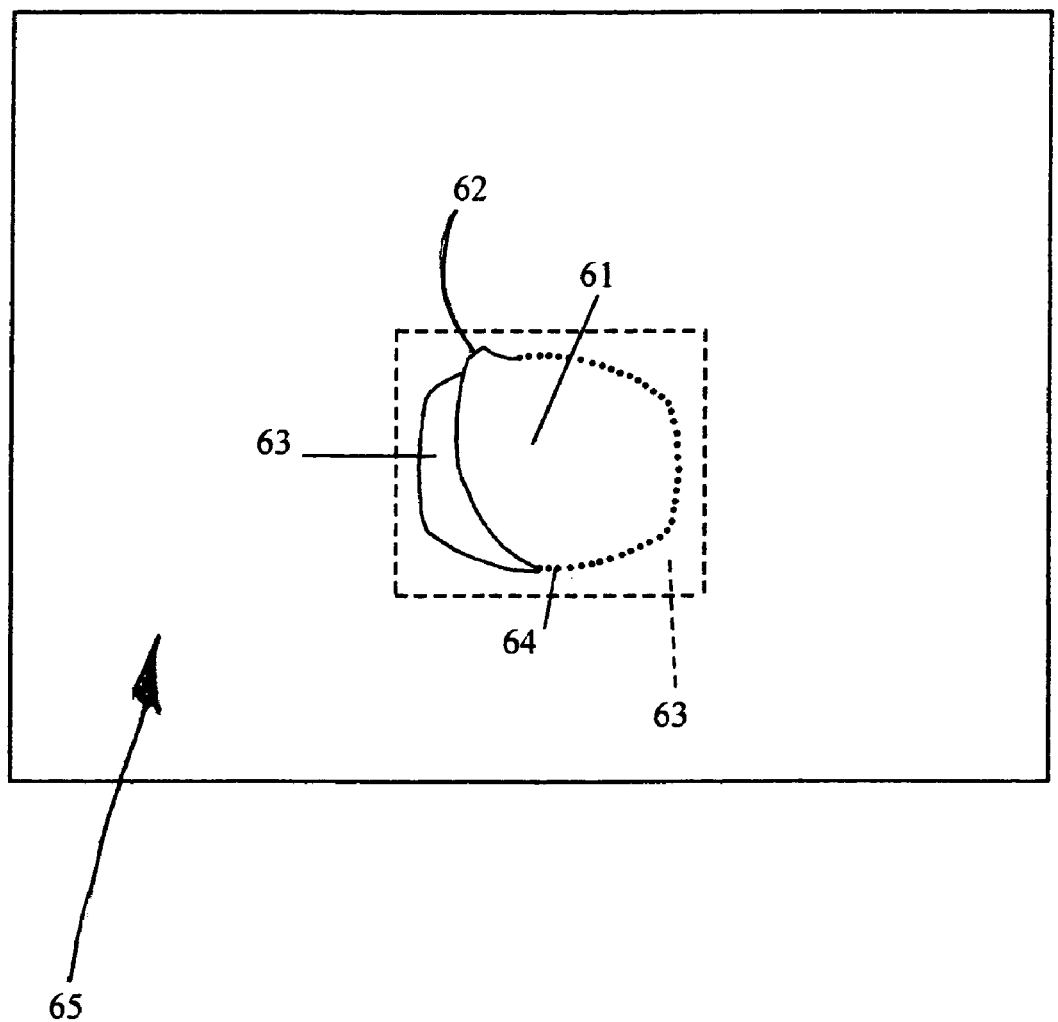
FIG. 5 is a front view of a reusable envelope that can be made in accordance with the present invention from the envelope blank of FIG. 4 and showing the oval shaped tear off portion thereof partially removed.

FIGS. 4 and 5 illustrate an alternative embodiment of an envelope blank 60 for forming an envelope 65. Preferably, the envelope blank 60 is similar to the envelope blank 10 shown in FIG. 1 but includes an oval shaped tear away portion 61 with a tear away perforation 64 defining the portion 61 instead of the rectangular tear away portion 30 of the envelope blank 10. The oval or D-shaped aspect of the tear away portion 61 preferably minimizes corners or flaps that could interfere with post office processing equipment. The envelope blank 60 preferably includes a panel 63 similar to the panel 46 described previously with respect to the envelope blank 10. As such, when the tear away portion 61 is removed, the panel 63 is exposed. The panel 63 may be blank or may be preaddressed or may comprise an additional tear away portion for allowing yet another reuse of the envelope structure thereby providing an envelope that can be reused one or more times. The tear away portion 61 can be used on new envelopes, preprinted envelopes or used envelopes to allow readdressing and/or forwarding of a new or used envelope thus making it easy to reuse envelopes and when finished making it easier to recycle envelopes by using earth friendly papers, and adhesives.

Figure 6:
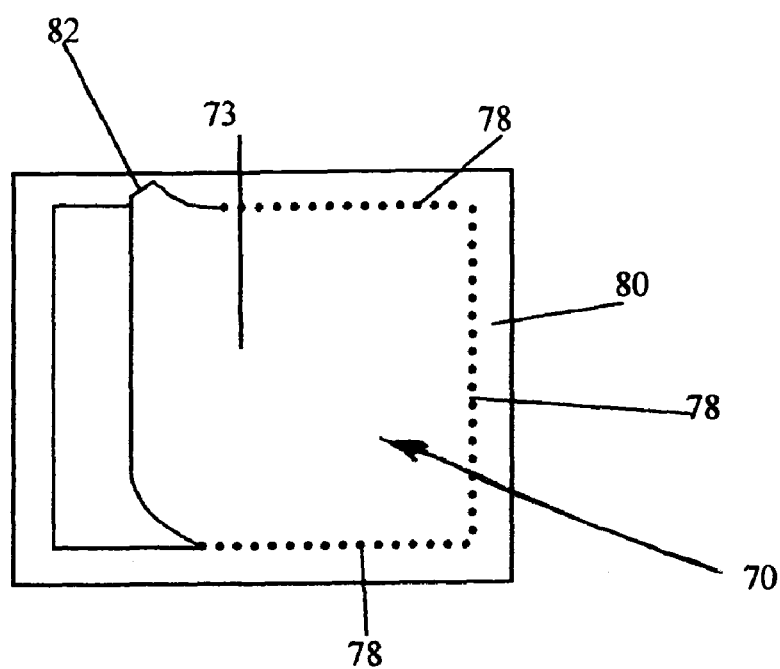
FIG. 6 is a top view of a label structure made in accordance with the present invention for forming a reusable envelope showing, in particular, a removable portion thereof partially removed.
Figure 7:
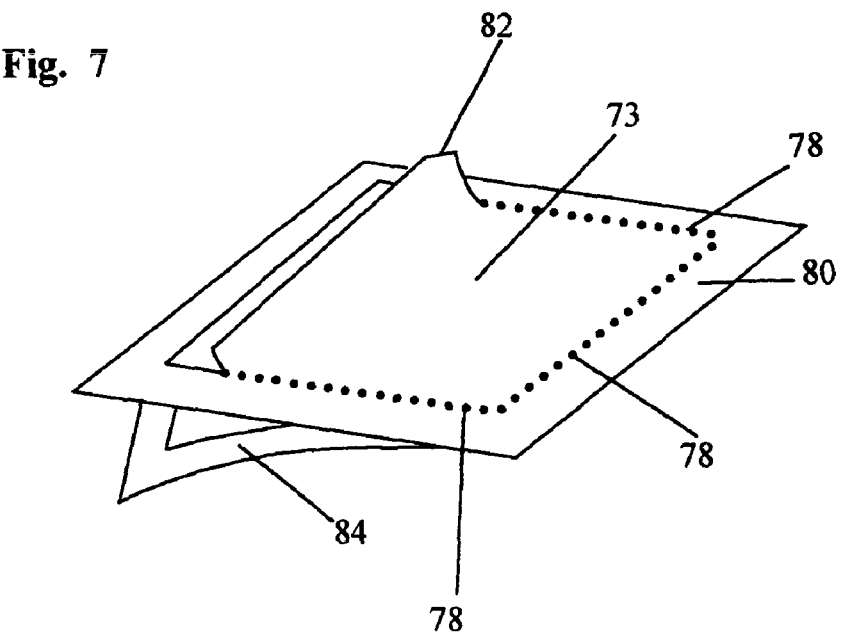
FIG. 7 is a perspective view of the label structure of FIG. 6 showing, in particular, an adhesive liner thereof partially removed.
Figure 8:
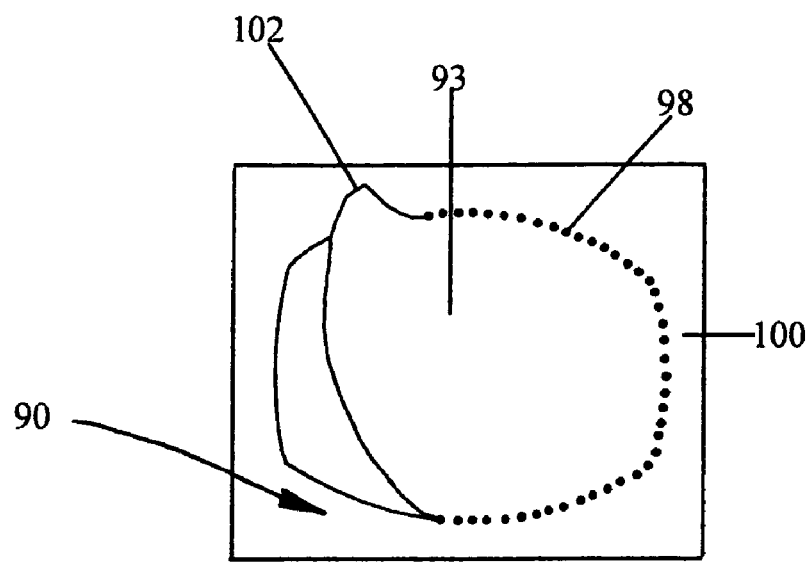
FIG. 8 is a top view of a label structure made in accordance with the present invention for forming a reusable envelope showing, in particular, an oval shaped removable portion thereof partially removed.
Figure 9:
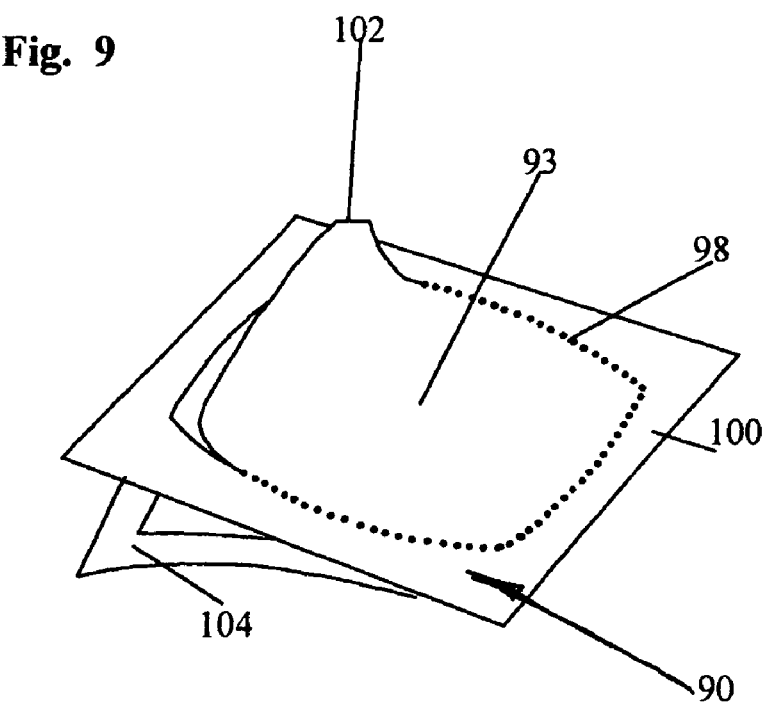
FIG. 9 is a perspective view of the label structure of FIG. 8 showing, in particular, an adhesive liner thereof partially removed.

In FIGS. 6 and 7 a label structure 70 attachable to an envelope, mailing device, or mailing container for forming a reusable or remailable envelope or structure therefrom, is shown. It is contemplated that the label structure 70 may be used with any article or container desired to be reusable or remailable. Also, in FIGS. 8 and 9 a similar label structure 90 is shown. Preferably, the labels 70 and 90 include tear away portions 73 and 93 respectively, border portions 80 and 100 respectively surrounding the tear away portions 73 and 93, and slits 82 and 102 for removing the tear away portions 73 and 93. As shown, the tear away portions 73 and 93 are defined by perforations 78 and 98 respectively. The tear off portion may be any desired shape and one preferred shape comprises an oval or D-shape for minimizing interference with post office processing machines as can be seen in FIGS. 8 and 9. Also, the labels 70 and 90 preferably include an adhesive positioned on border portions 80 and 100 so that the border portions 80 and 100 can be secured to an envelope or the like and so the that the tear away portions 73 and 93 can be removed thereby revealing a clean surface or a preprinted address or the like as described below. Also as shown, the adhesive preferably includes removable liners 84 and 104 covering the adhesive. It is contemplated that any adhesive, such as an earth-friendly activatable adhesive may be used.

The labels 70 and 90 may be applied to an envelope face or panel by removing border adhesive liner 84 or 104 from back of label border 80 or 100 and sticking border 80 or 100 to the envelope face. Alternatively, the labels 70 and 90 may be used with any shipping container desired to be easily reusable or remailable. Tear away labels 73 and 93 can remain in place and function as a primary address or return address or postage mark until desired to be removed by using slits 82 or 102 respectively. Removal of tear away portions 73 and 93 may reveal a blank address area for the envelope to be readdressed and forwarded or a preprinted address for resending the envelope to the originator or other recipient. Tear away labels 73 and 93 may be saved as an address label for later use on another envelope or may be used as the return address when envelope is being forwarded. That is, the tear away portions 73 and 93 preferably include an adhesive on the back of the tear away portions 73 and 93, however, the tear away portions 73 and 93 may be formed without adhesive if desired. The labels 70 and 90 may be any desired shape and size including, but not limited to, standard address and return address label sizes, ovals, circles, squares, triangles, rectangles, trade marks, and puzzle shapes in accordance with the present invention.

By using the labels 70 and/or 90 as a tear away address label and/or a tear away return address label in accordance with the present invention it is possible to create a reply envelope out of any envelope by simply tearing off the respective removable portions of the labels and reapplying, by using the adhesive, the removable portions oppositely. That is, the original return address becomes the new destination address and the original destination address becomes the new return address. It is noted that tape or other means to reseal the envelope might be needed if a resealable envelope is not used.

It is contemplated the labels 70 and 90 may be configured to have the return address tear away label and the destination address tear away label on one large label. It is also contemplated the labels 70 and 90 may be configured to have multiple labels on one sheet of standard size 8.5×11 adhesive back paper (preferably with a liner) capable of being printed by a suitable printer such as a laser or ink jet printer for multiple address labeling or mail merge applications. In another aspect of the present invention, the labels 70 and 90 may be stacked in order to reuse an envelope one or more times or to forward an envelope or package one or more times.

Figure 10:
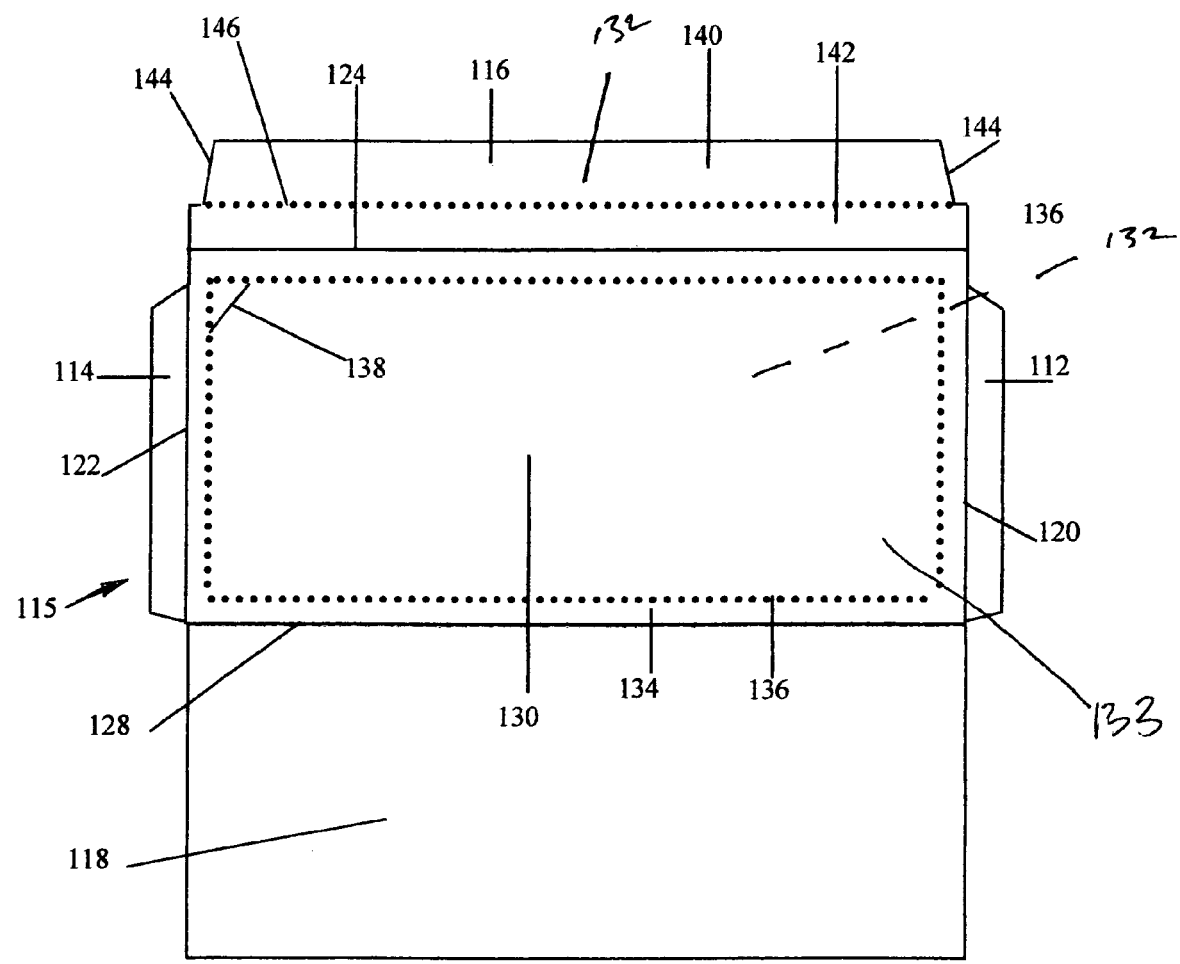
FIG. 10 is an outside view of an envelope blank that can be made in accordance with the present invention showing, in particular, a tear off portion thereof.

In FIG. 10, an envelope blank 115, preferably made of recycled paper, plastic, cloth or other material suitable for the creation of an envelope, is shown. Preferably, the envelope blank 115 includes side flaps 112 and 114, seal flap 116 and bottom flap 118. Flaps 112, 114, 116, and 118 can be folded along lines 120, 122, 124 and 128 respectively to form an envelope such as the envelope 121 shown in FIGS. 11 and 12 and described below.

As illustrated, the envelope blank 115 preferably includes a panel 132 which includes a panel 133 having a tear away portion 130 and a border 134. As shown the border 134 is attached to a panel 132 by securing the border 134 to the panel 132 with an adhesive or the like. Preferably, only the border 134 is attached to the panel 132 so that the tear away portion 130 is removable. It is contemplated however, that the envelope blank 115 may be formed in any way such that it comprises a tear-off face. For example, the envelope blank may be oval or triangular shaped.

The tear away portion 130 of the panel 133 and the border 134 is defined by a perforation 136 inset by a desired amount on all four sides of the panel 133. Preferably, the perforation 136 is cut at predetermined intervals such that the tear away portion 130 and the border 134 may be integral portions of the panel 133. Perforation 136 is preferably formed on all four sides of tear away portion 130 to help ensure that the tear away portion 130 will not be accidentally removed during processing and delivery. Tear away portion 130 and border 134 are preferably the same size as the panel 132 but may be different.

As shown perforation 136 around tear away portion 130 defines the shape of the tear away portion 130. Preferably, the tear away portion 130 is rectangular in shape in accordance with standard envelopes. It is contemplated that the tear away portion 130 and border 134 can be any desired shape and size to fit a multitude of envelopes or other mailing devices or the like.

A means to remove the tear away portion 130 is illustrated as a slit corner or a notched corner 138. To remove the tear away portion 130 the slit or notched corner 138 is used to break the perforation 136 and thereby release the tear away portion 130. Accordingly, the border 134 remains on the envelope. In accordance with the present invention, the tear away portion 130 can be blank or printed with a destination address, return address, or a postage mark. The back side of the tear away portion 130 may be blank or printed as a reply device such as a survey, invoice, notice of acceptance, coupon or other call to action device thereby eliminating the additional weight of a reply device inside the envelope.

Figure 11:
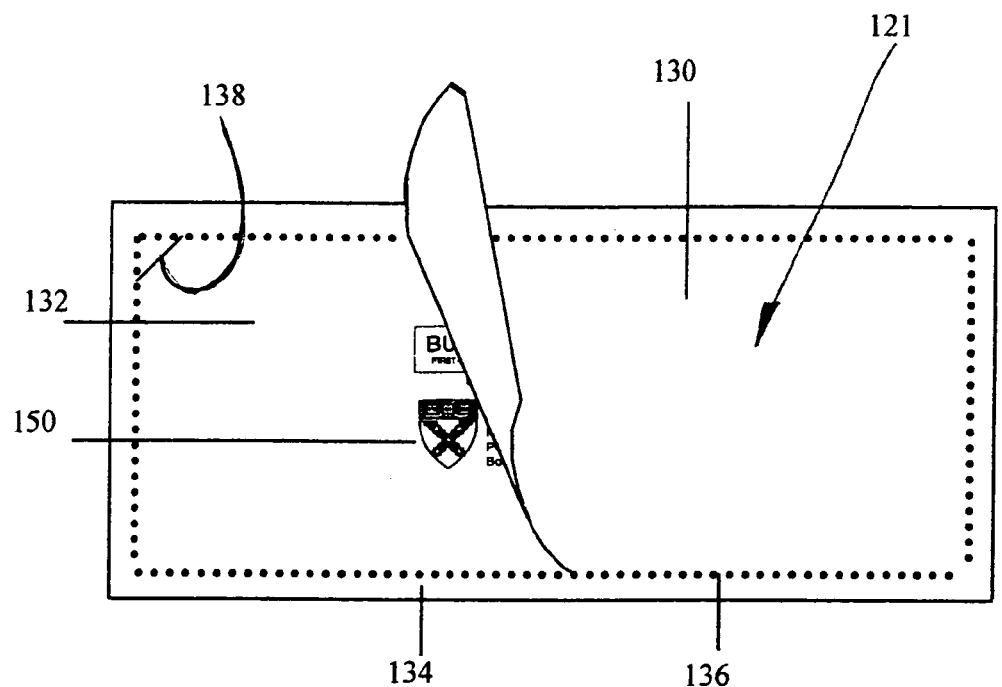
FIG. 11 is a front view of a reusable envelope that can be made in accordance with the present invention from the envelope blank of FIG. 10 and showing the tear off portion thereof partially removed.

As shown in FIG. 11, by removing tear away portion 130, the panel 132 may be revealed. As described above, the border 134 is preferably attached to the panel 132. The panel 132 can be blank thereby allowing the envelope to be reused at another time or can be preprinted with a business reply address 150, 152, indicia 154, bar code 156 or other address information. The panel 132 could also have a window(s) with or without cellophane or a pocket.

In order for the panel 132 to be used as a reply envelope, preprinted reply address 150, 152 indicia 154, and bar code 156 should be correctly positioned for post office electronic scanners for correct delivery. Preferably business reply address 150, 152 indicia 154, bar code 156 are preprinted within the specifications of the post office for acceptable reply mail.

Figure 12:
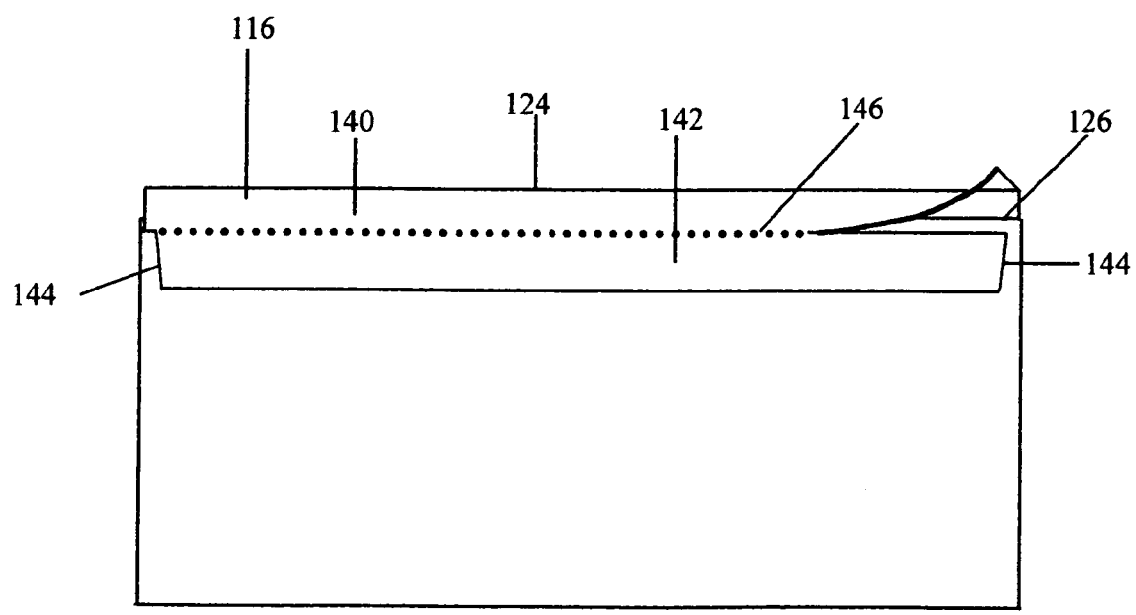
FIG. 12 is a rear view of the reusable envelope of FIG. 11 and showing, in particular, a reusable closure thereof in accordance with the present invention.

As shown in FIG. 12, seal flap 116 comprises perforation 146 and sections 140 and 142. Seal flap 142 may comprise a bevel cut 144 indented at each end of seal flap 142 making seal flap 142 shorter than seal flap 140. Seal flap 116 has two fold lines 124 and 126. Fold line 124 is used when seal flap 142 is secured to the envelope when sent from originator, and fold line 126 is used with seal flap 140 when envelope is returned or forwarded. To open the envelope a finger, thumb, or tool can be inserted under second seal flap 140 and moved along the length of perforation 146 until seal flap 140 is released. For resealing envelope, seal flap 140 is remoistened or liner removed, folded on line 126, and pressed to seal for returning contents. Both seal flaps 140 and 142 preferably utilize earth friendly activatable glue or adhesive with an adhesive liner back for sealing and resealing.

Figure 13:
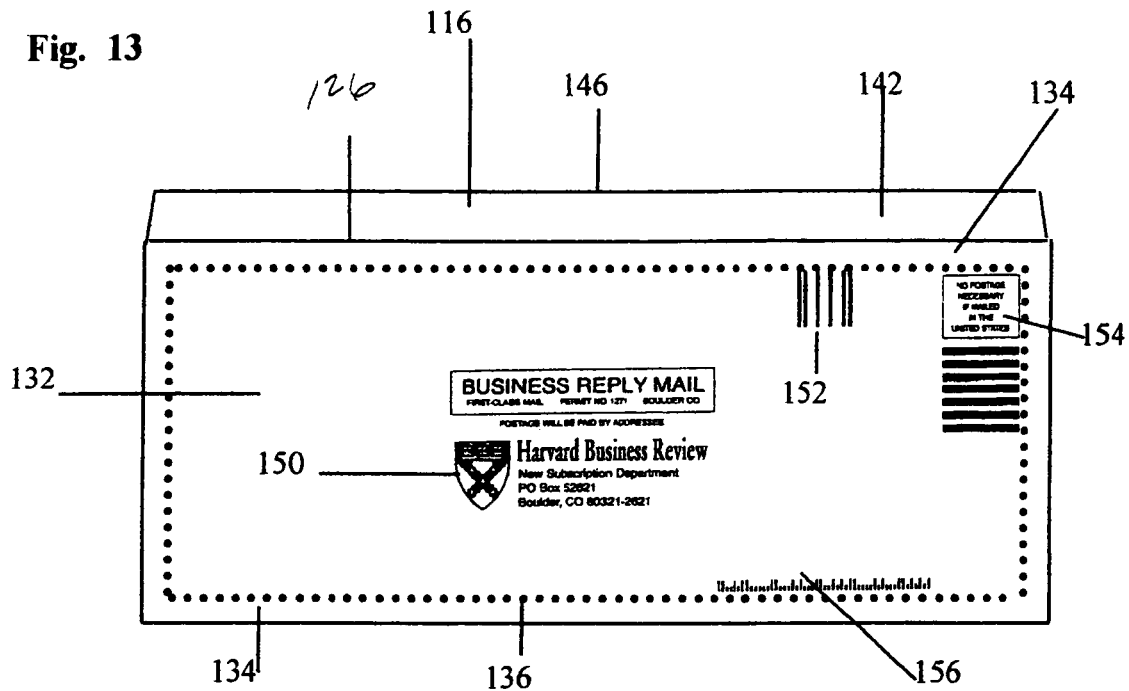
FIG. 13 is a front view of a reusable envelope in accordance with the present invention showing the envelope after being opened by using a reusable closure in accordance with the present invention.
Figure 14:
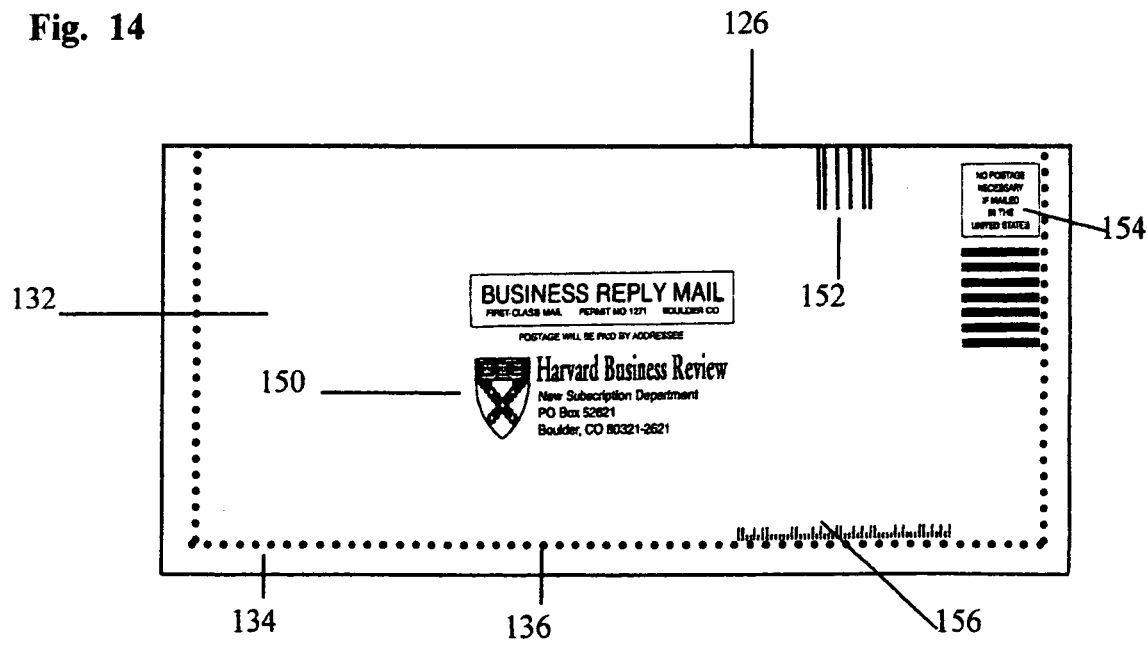
FIG. 14 is a front view of the reusable envelope of FIG. 13 showing, in particular, the envelope after being resealed by a reusable closure in accordance with the present invention.

As illustrated in FIGS. 13 and 14, when the second seal flap 140 is folded on fold line 126 to reuse the envelope, the top portion of border 134 may be folded down, thereby allowing indicia 152 to be positioned on top edge of envelope, thus securely resealing envelope for reply and meeting post office specifications for preprinted business reply envelopes.

Figure 15:
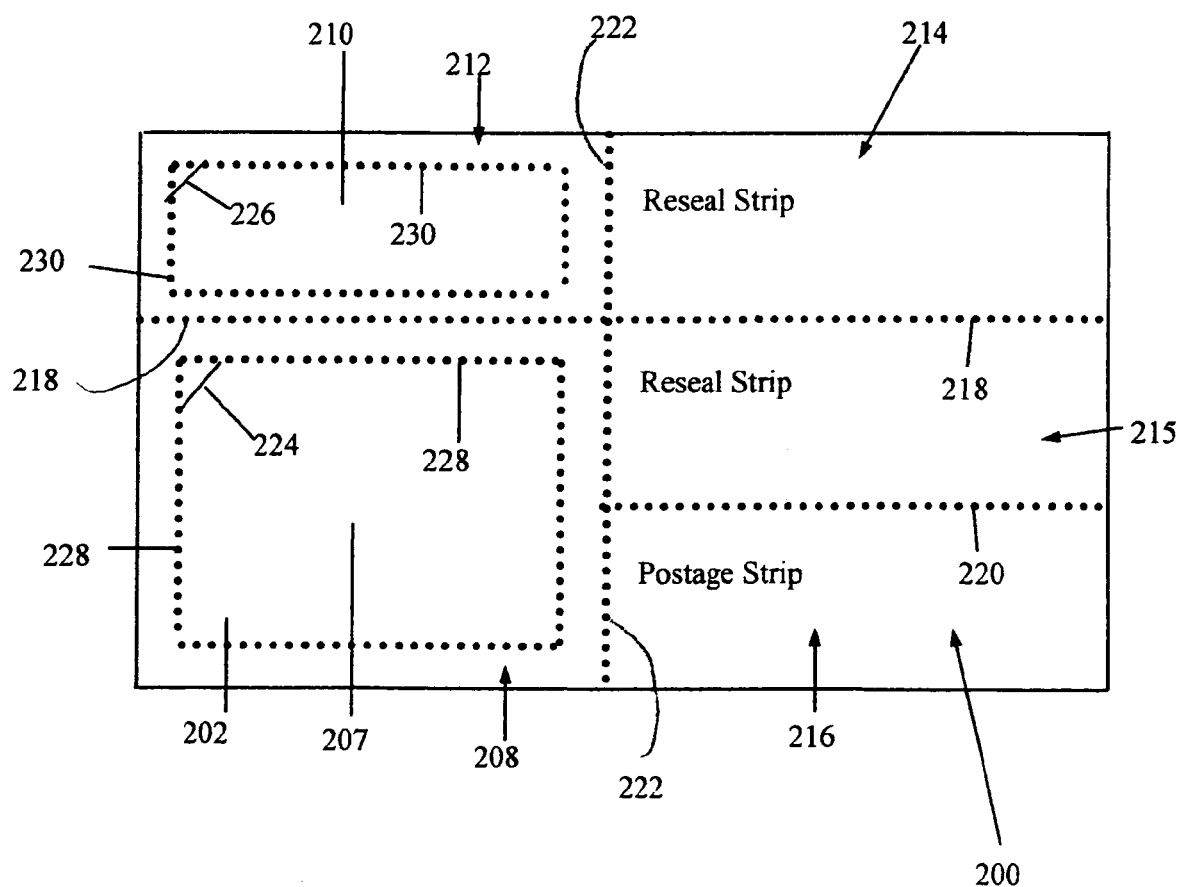
FIG. 15 is a front view of a kit that may be formed in accordance with the present invention for creating a reusable envelope.

In another aspect of the present invention, a self addressed stamped envelope kit or SASE Kit is provided, which may be used to convert an existing envelope, mailing device, shipping container, or the like to an envelope or structure that can be reused one or more times. An exemplary SASE Kit 200 is shown in FIG. 15 and comprises labels 208 and 212 with tear away label portions 207 and 210 formed in accordance with the present invention. The SASE Kit 200 further comprises reseal strips 214 and 215 and a return postage strip 216. An SASE Kit may be used to send contents in an envelope with the intention of the contents and the same envelope being returned. That is, the SASE Kit 200 may be included inside the envelope or may be attached to the envelope as described below. With this method only one envelope is needed to send and return information. Additionally, the SASE Kit 200 may be used to simply make an envelope reusable.

Figure 16:
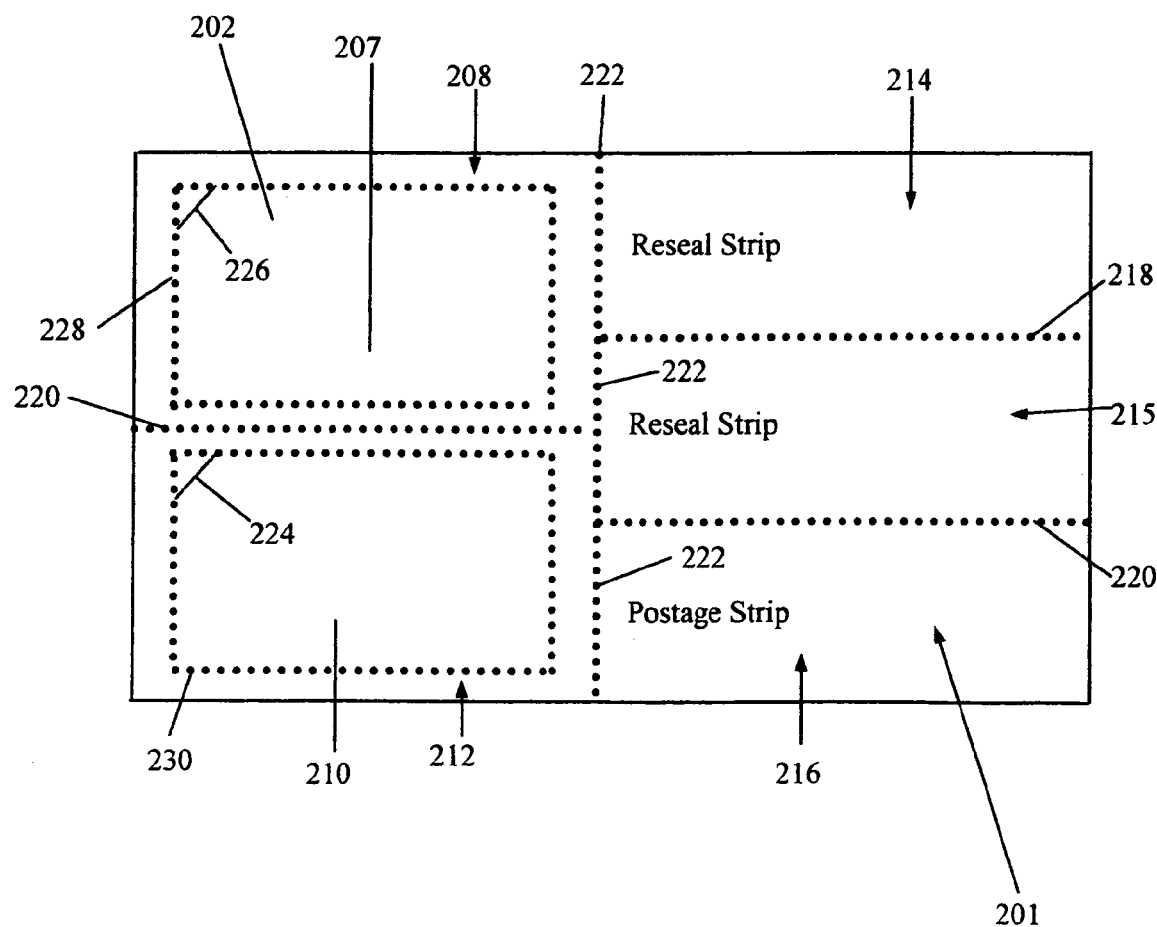
FIG. 16 is a front view of an alternate embodiment of a kit that may be formed in accordance with the present invention for creating a reusable envelope.

Each of the parts of the SASE Kit 200 are preferably formed and defined by perforations 218, 220, and 222. That is, perforations 218 and 222 define reseal strip 214, perforations 218, 220, and 222 define reseal strip 215, perforations 220 and 222 define postage strip 216, perforations 218 and 222 define label portion 210, and perforations 218 and 222 define label portion 208. Perforations 228 and 230, as shown, define tear away portion 207, and tear away portion 210 respectively. A means to remove tear away portions 207 and 210 is provided by slit corner or notched corner 224 and 226 for the tear away portions 207 and 210 respectively. In FIG. 16 an alternative SASE Kit 201 is illustrated in which the portions 207 and 210 are similarly sized and shaped. It is contemplated that the portions 207 and 210 may be any desired size and/or shape and that the reseal strips 214 and 215 may be provided in any size, shape, or quantity. Further, the postage strip 216 may be any desired size and shape, however, it is preferred to be of a size and shape capable of covering at least a portion of a conventional postage mark.

In an aspect of the present invention, SASE Kit 200 may include an adhesive for attaching the SASE Kit 200 to a panel of an envelope or shipping container or the like. For example, SASE Kit 200 may be attached to a rear panel of an envelope rather than being placed inside an envelope. The envelope may be sent, with contents if desired, to a recipient. The recipient can then remove the contents and reuse the envelope by utilizing the SASE Kit 200 attached thereto (or placed inside). The removable portion 207, which may be blank or preaddressed, may be removed and placed over the original destination address and attached by adhesive or tape or similar technique. Removable portion 210 may be similarly utilized with respect to a return address. Also, reseal strips 214 and 215 may be used to reseal the envelope. Postage strip 216 may be preprinted with a postage mark, bar code, or other indicia and utilized accordingly.

Figure 17:
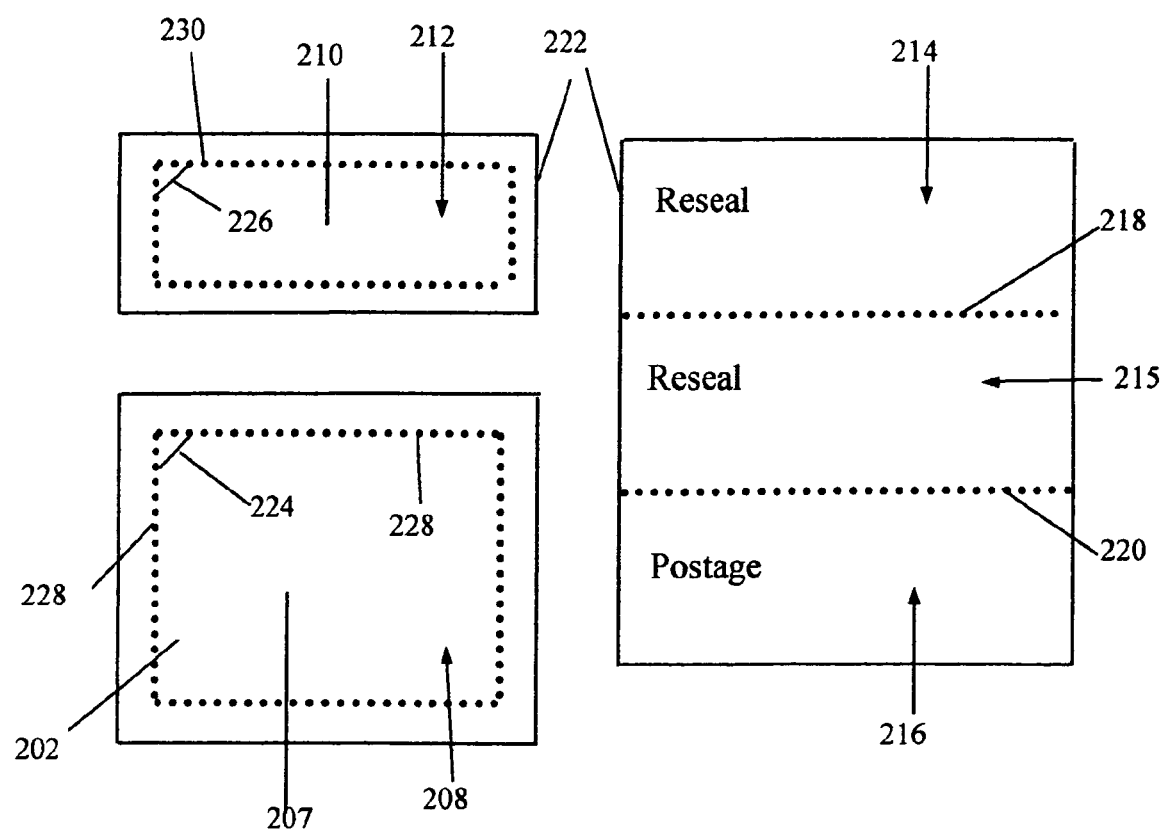
FIG. 17 is a front view of the kit of FIG. 15 showing, in particular, portions of the kit separated along lines of perforation.
Figure 18:
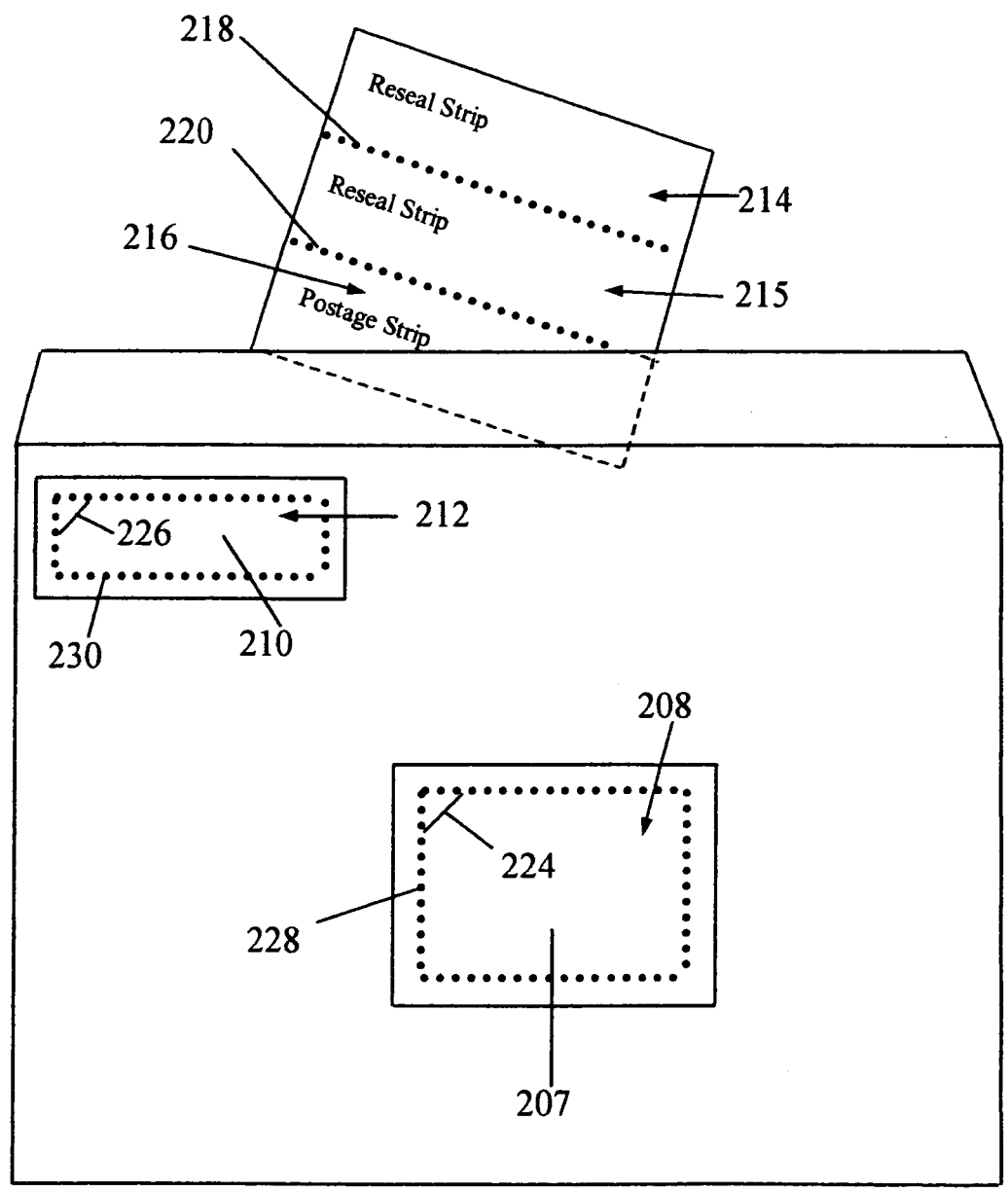
FIG. 18 is a front view of a reusable envelope that can be formed in accordance with the present invention by using the kit of FIG. 17 and showing, in particular, portions of the kit attached to the front of the envelope and portions of the kit being placed within the envelope for future use.

FIGS. 17-20 illustrate various additional aspects of using the SASE Kit 200. In FIG. 17 the portions 208 and 212 are shown separated from each other and from the seal strips 214 and 215 and the postage strip 216. The portion 208 may be attached as a destination address label to an envelope as shown in FIG. 18. Also, the portion 212 may be attached as a return address label as shown in FIG. 18.

In FIG. 18, the envelope is shown ready to be addressed and contents put in the envelope. The reseal strips 214 and 215 and the postage return strip 216 may be included in the envelope with the contents being mailed. If identical articles are to be returned, for example, such as a contract that needs to be signed and returned, then the same postage may be on the face of the envelope and on the return postage strip.

Figure 19:
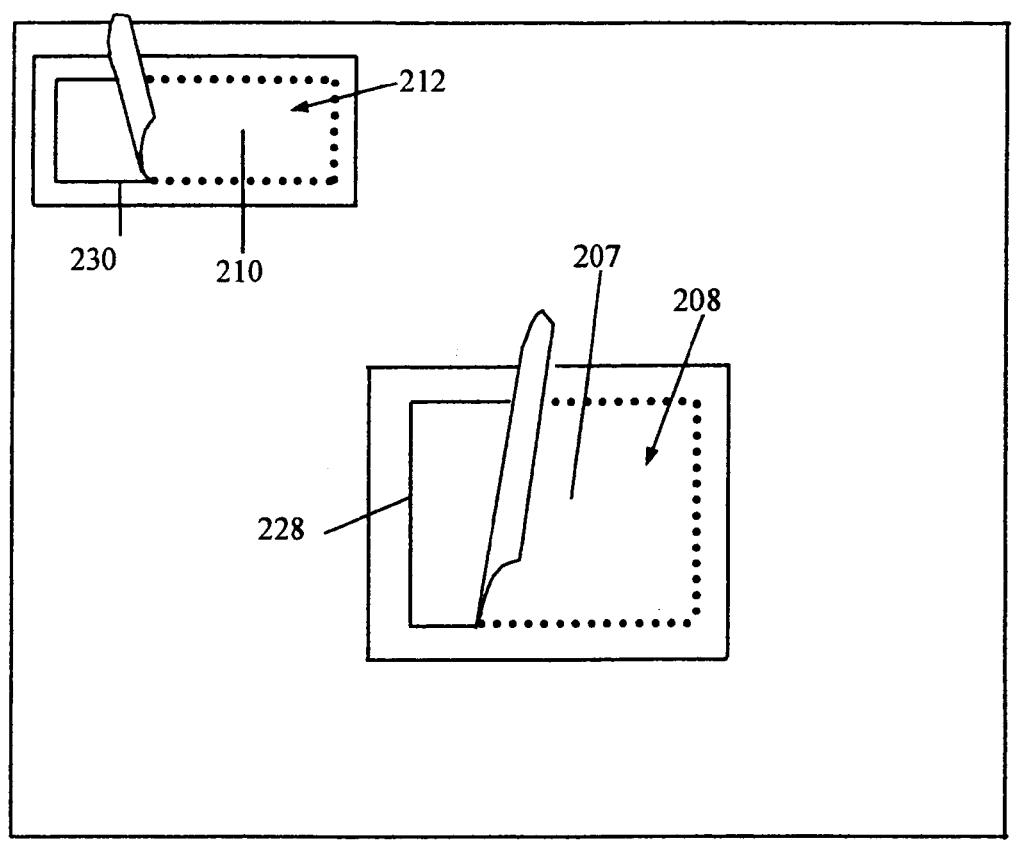
FIG. 19 is front view of the reusable envelope of FIG. 19 showing, in particular, removable portions of the portions of the kit attached to the front of the envelope partially removed.

In FIG. 19, the tear off portions 207 and 210 are shown partially removed. When a recipient receives the envelope, the envelope may be opened and the contents removed and put back into the envelope if desired. Tear away address label 207 and return address label 210 may be removed from the face of the envelope by pulling slit or notched corner 224 and 226 thereby tearing along perforations 228 and 230. Once labels are removed adhesive may be activated and labels switched so original return address label 210 is now the destination address label and original destination address label 207 is now the return address label. Also, the new postage strip 216 may be torn away from reseal strips 214 and 215 along perforation 220 and placed over the cancelled postage.

Figure 20:
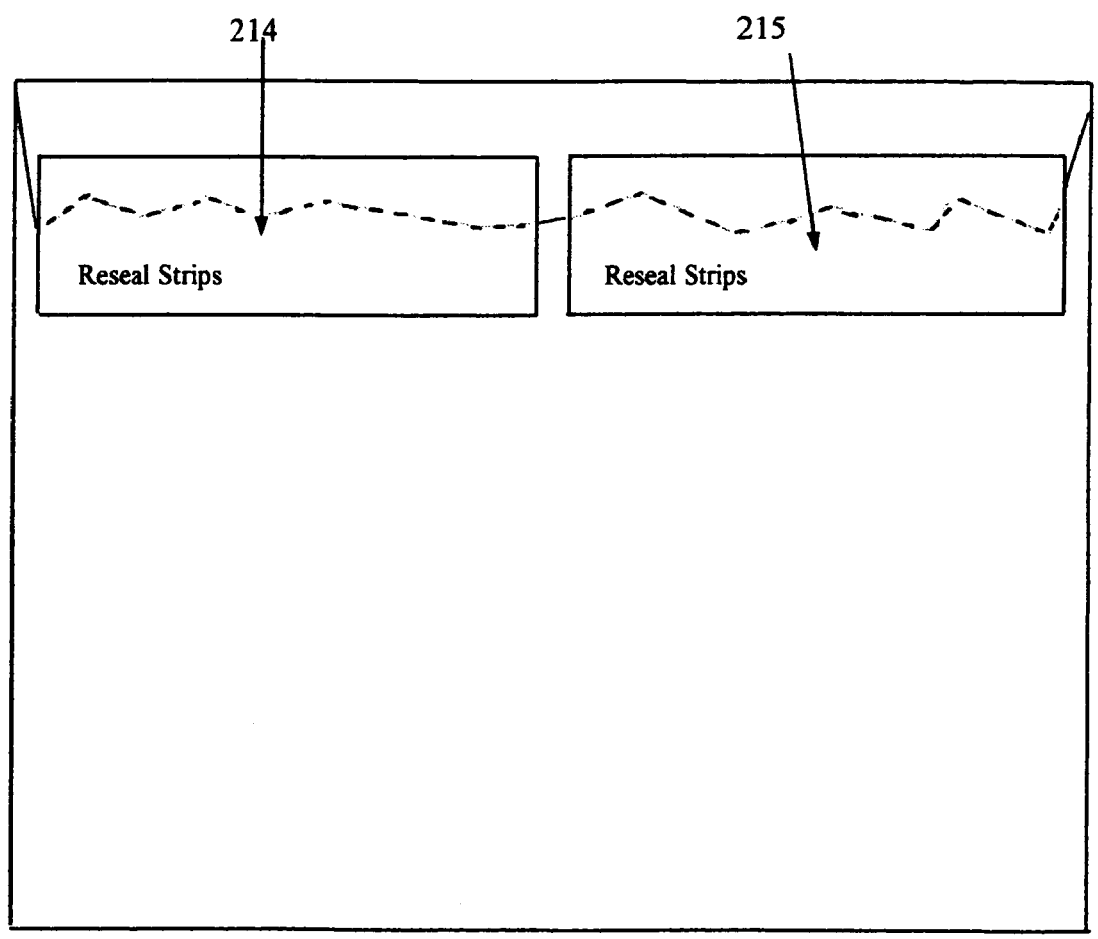
FIG. 20 is a rear view of a reusable envelope that can be formed by using the kit of FIG. 17 and showing, in particular, a closure flap of the envelope being resealed by portions of the kit.

In FIG. 20, reseal strips 214 and 215 are shown separated along perforation 218 and are used to securely reseal the envelope by placing over reseal flap or opening of original envelope as illustrated. It is contemplated that any number of reseal strips may be used.

Figure 21:
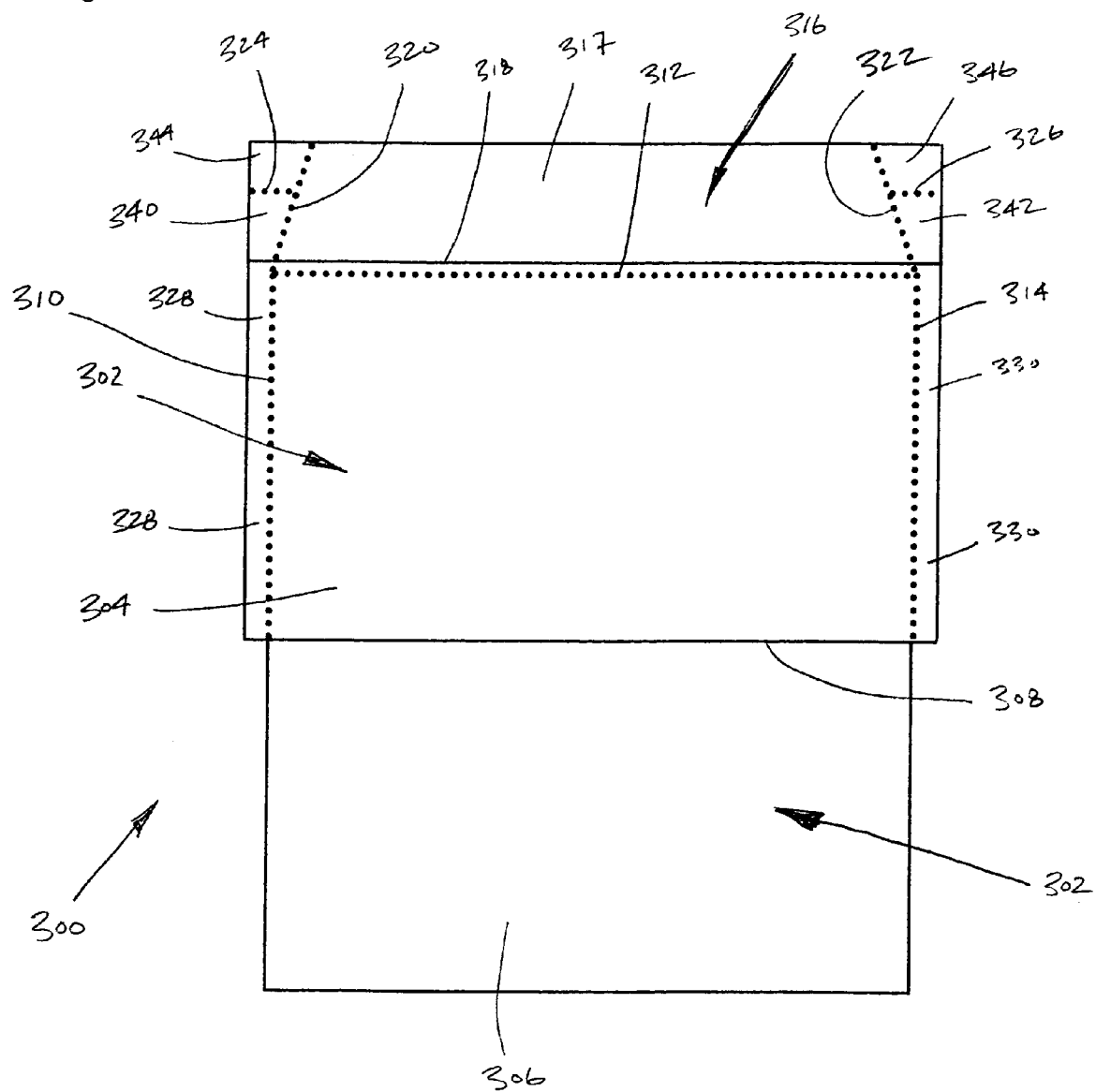
FIG. 21 is a top view of a structure that can be made in accordance with the present invention that can be attached to an envelope for forming a reusable envelope.

In another aspect of the present invention a structure 300 capable of being attached to an existing envelope to form a reusable envelope is provided. An exemplary embodiment of the structure 300 is shown in FIG. 21. Preferably, the structure 300 is formed from paper or any other material suitable for forming an envelope such as tree-free, recycled paper, plastic, etc. Preferably, the structure 300 includes a removable portion 302. As shown, the removable portion 302 includes a first panel 304 and a second panel 306 which are preferably foldable with respect to each other by fold line 308. The removable portion 302 may, however, include any desired number of panels having any desired shape. Preferably, perforations 310, 312, and 314 are provided so that the removable portion 302 may be separated from the structure 300. The perforations 310, 312, and 314 define the first panel 304 as shown and may be any line of weakness or the like such that the removable portion 302 may be separated from the structure 300.

The structure 300 further includes a flap 316, which is preferably foldable along line 318. As described below, the flap 316 may be used as a sealing flap for sealing an envelope structure. Preferably, the flap 316 includes a removable portion 317, which is defined by perforations 312, 320, and 322. As such, the removable portion 317 of the flap 316 may be removable with the removable portion 302 or may be removable independently. Also, as illustrated the flap 316 preferably includes perforations 324 and 326 that may be used with certain envelope structures so that a sealing flap on an envelope to which the structure 300 is attached may be reused as described in detail below.

Further referring to FIG. 21, the structure 300 preferably includes a region 328 and a region 330 capable of attaching the structure 300 to a face of an envelope. Attaching the structure 300 to the face of an envelope may be accomplished by using conventional adhesives or the like. In one aspect of the present invention an earth friendly adhesive may be used.

Figure 22:
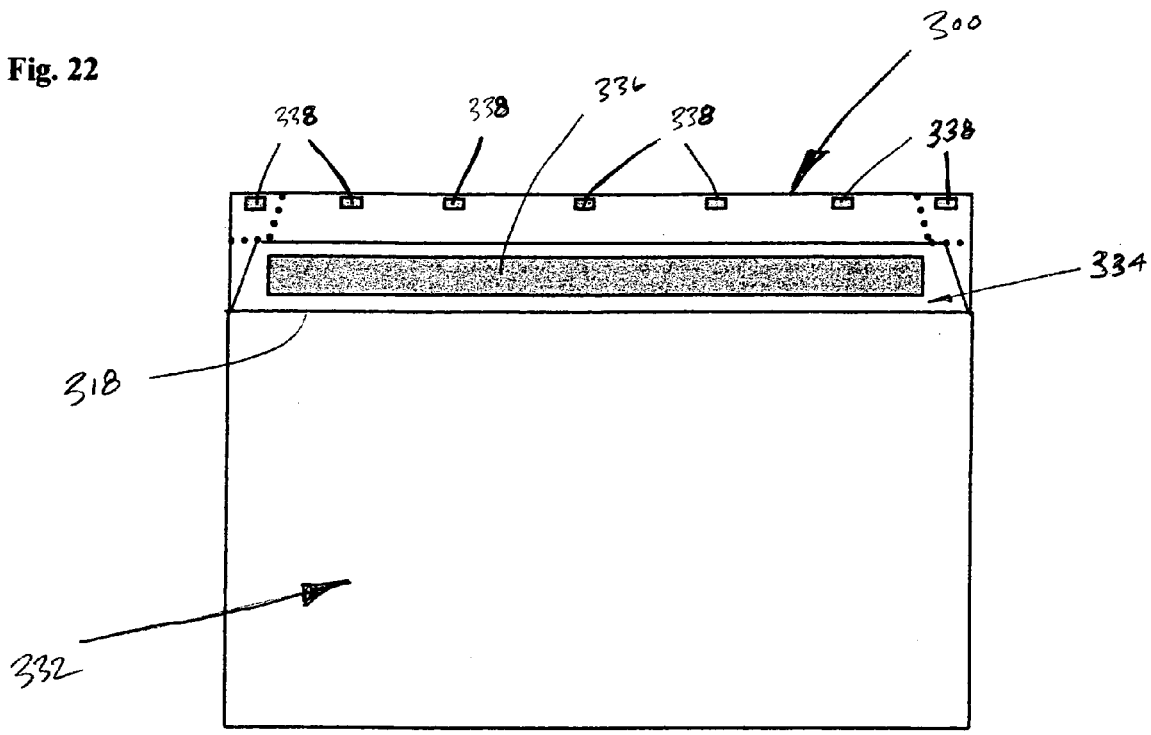
FIG. 22 is a rear view of a reusable envelope that can be formed in accordance with the present invention showing, in particular, the structure of FIG. 21 attached thereto.
Figure 26:
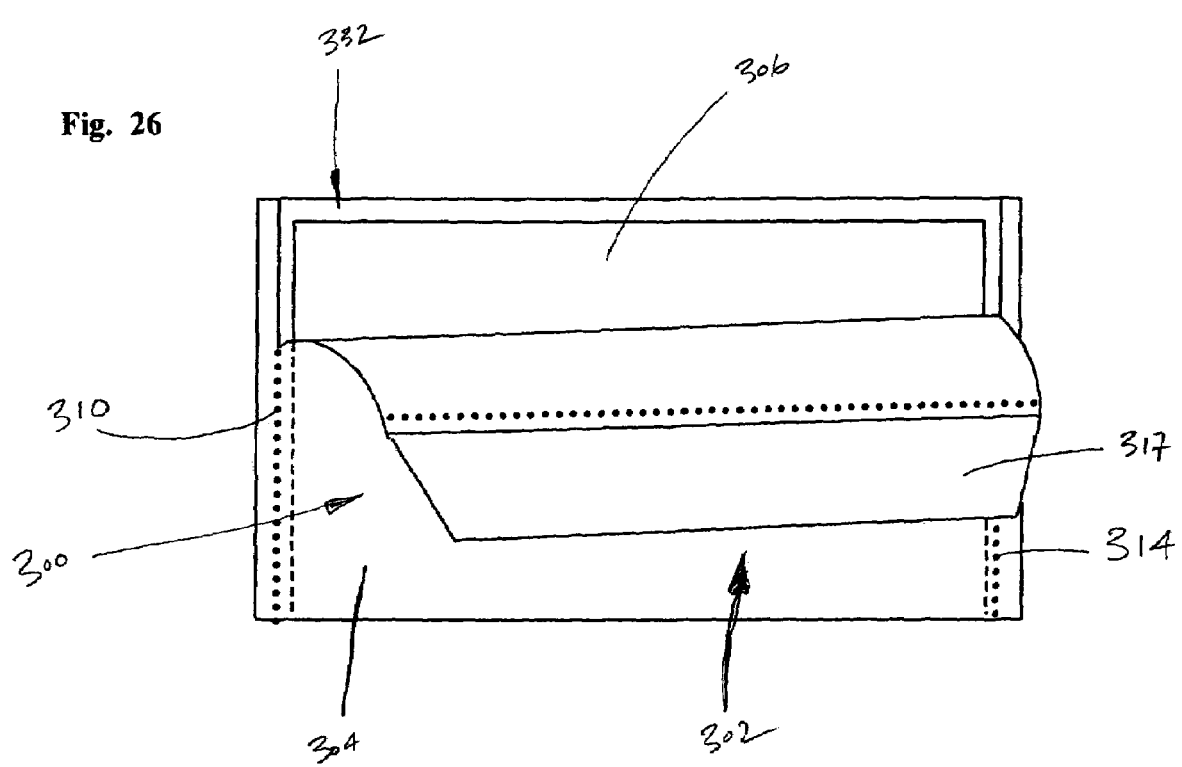
FIG. 26 is a front view of the envelope of FIG. 25 showing the removable portion of the panel of FIG. 21 further detached from the envelope in accordance with the present invention.

Referring to FIG. 22, the structure 300 is shown attached to the face of an envelope 332 and is illustrated from the rear side of the envelope 332. As illustrated, the envelope 332 includes a sealing flap 334, which is foldable along fold line 318 and includes an adhesive region 336. It is contemplated that any size and shape of envelope may be used in conjunction with the structure 300 such that the functional aspects of the present invention are accomplished. Preferably, the structure 300 is attached to the face of the envelope 332 by using an adhesive positioned on region 328 and 330 and such that the second panel 306 is folded along the fold line 308 so that the second panel 306 generally coincides with the first panel 304 and is positioned between the face of the envelope 332 and the first panel 304 as can be seen in FIG. 26. In an aspect of the present invention a releasable adhesive may be placed on a desired portion of the second panel 306 so as to attach the second panel 306 to the face of the envelope 332. Preferably, the second panel 306 is attached to the face of the envelope 332 near the fold line 308.

Figure 23:
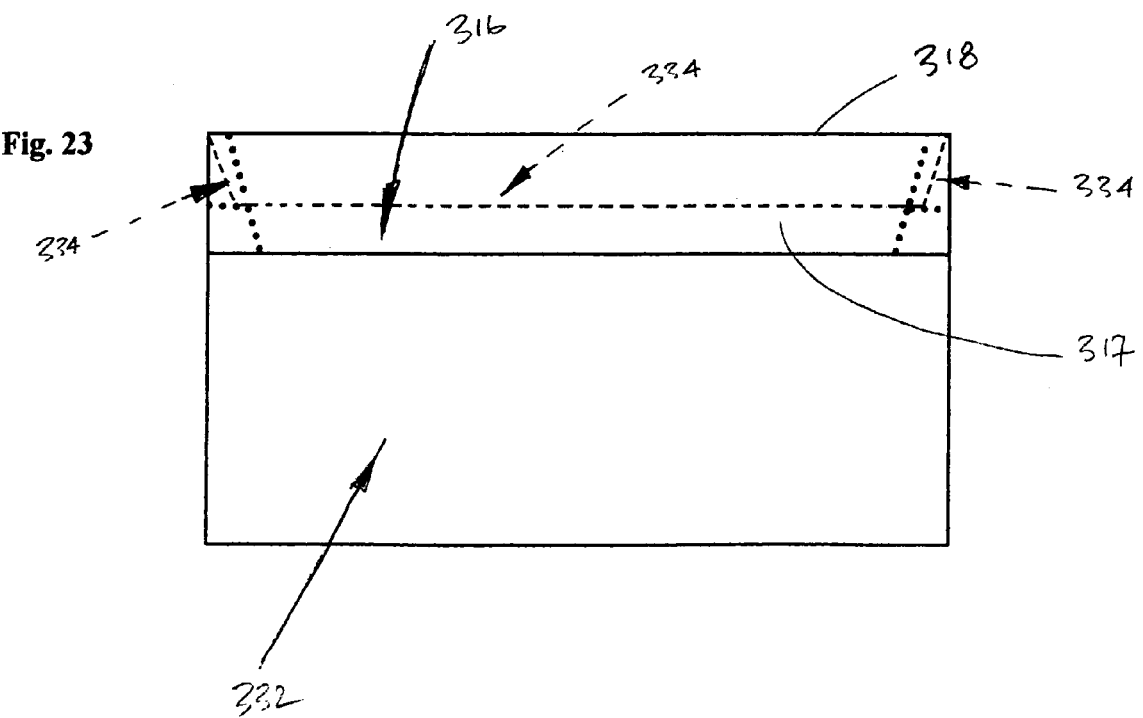
FIG. 23 is a rear view of the envelope of FIG. 22 showing, in particular, a closure flap of the envelope in a closed position in accordance with the present invention.

Further referring to FIG. 22, the flap 316 preferably includes adhesive regions 338 formed on the flap 316 so that the flap is capable of being folded along fold line 318 and sealed to the rear side of the envelope 332 as is illustrated in FIG. 23. Preferably, the sealing flap 334 of the envelope 332 is not sealed thereby making it reusable. That is, the seal of the envelope is formed by the flap 316 of the structure 300.

In a preferred aspect of the present invention the envelope 332 may be preaddressed and may also included a postage mark. By attaching the structure 300 to the face of a preaddressed envelope as described above, the address and any postage mark formed thereon can be hidden so that it may function as a return address after the removable portion 302 of the structure 300 is removed. That is, after the removable portion 302 is removed a preaddressed envelope remains that can be used to send certain contents to the addressee. For example, a business may form personalized correspondence for a customer such as an invoice or bill or the like on the removable portion 302 of the structure 300 and then attach the structure 300 to the face of an envelope that already has a desired address such as the businesses address preprinted thereon. The customer's address can be placed on the opposite side of the first panel 304 and the correspondence can be mailed to the customer. When the customer receives the envelope 332 having the structure 300 attached thereto, the removable portion 302 containing the invoice or the like may be removed and, if desired may be placed within the envelope 332 and returned to the business with a payment for example.

Figure 24:
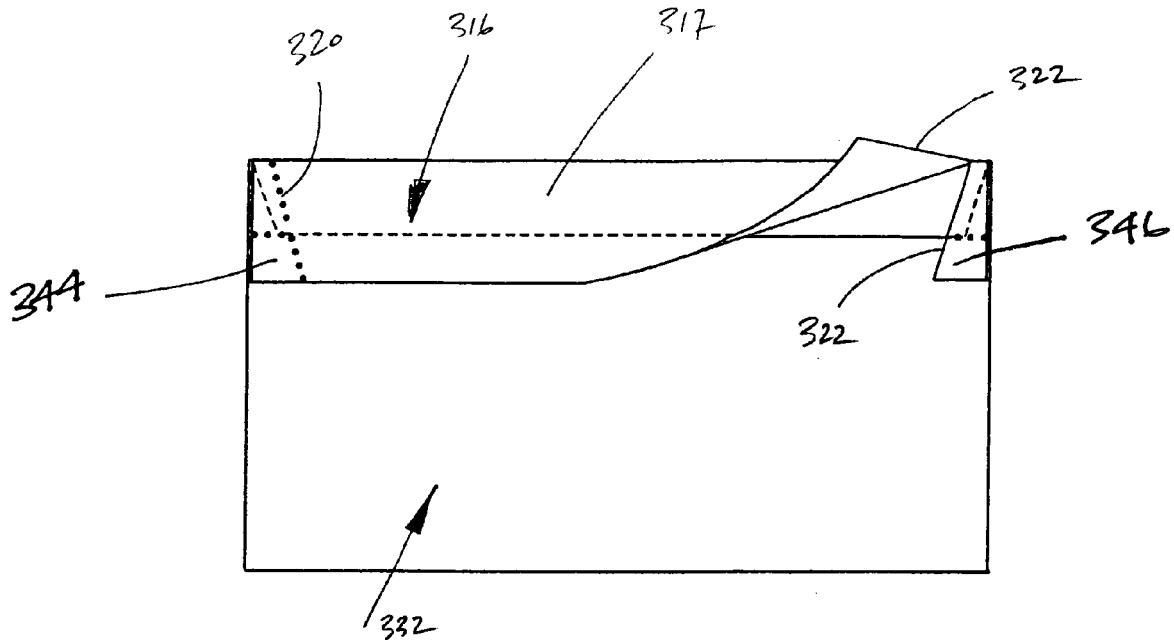
FIG. 24 is a rear view of the envelope of FIG. 23 showing a removable portion of the structure of FIG. 21 partially detached from the envelope in accordance with the present invention.
Figure 25:
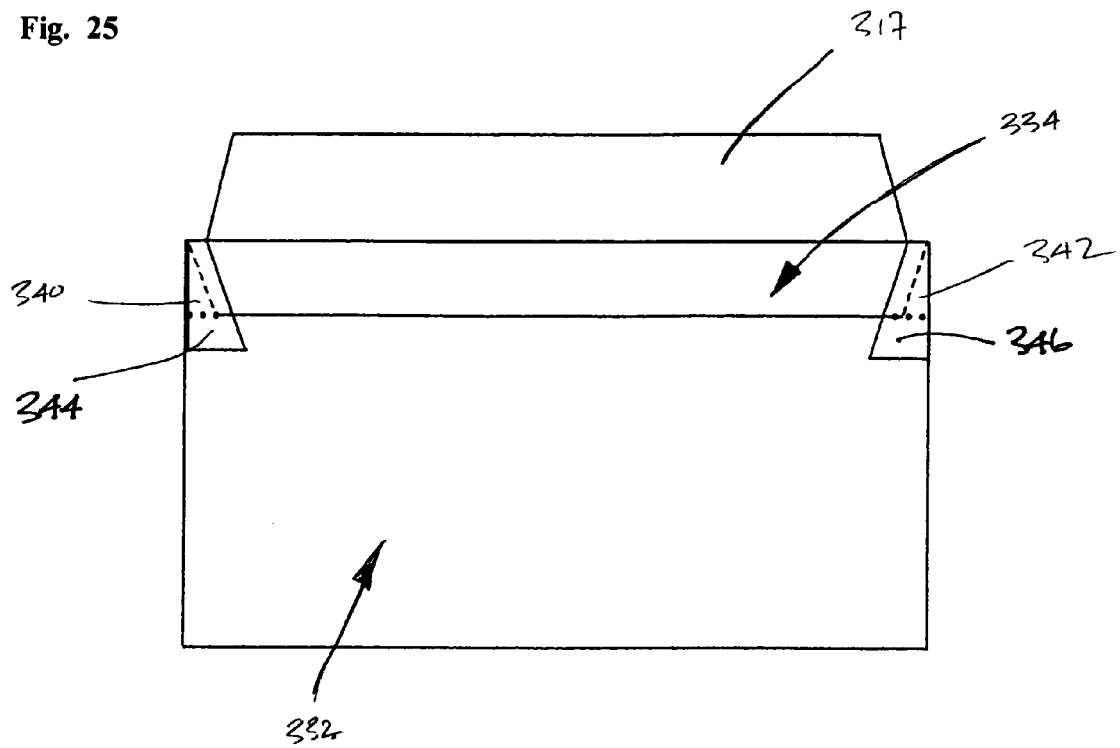
FIG. 25 is a rear view of the envelope of FIG. 24 showing the removable portion of the panel of FIG. 21 further detached from the envelope in accordance with the present invention.

In FIGS. 24, 25, 26, and 27 various stages of removing the removable portion 302 of the structure 300 from the envelope 332 are illustrated. Firstly, as shown in FIG. 24, the removable portion 317 of the flap 316 may be separated along perforations 320 and 322. As such, the removable portion 317 of the flap 316 may be separated from the flap 316 as shown in FIG. 25. It is noted that the sealing flap 334 of the envelope 332 is still at least partially held in place by portions 340 and 342 of the structure 300 and shown in FIG. 25.

Figure 27:
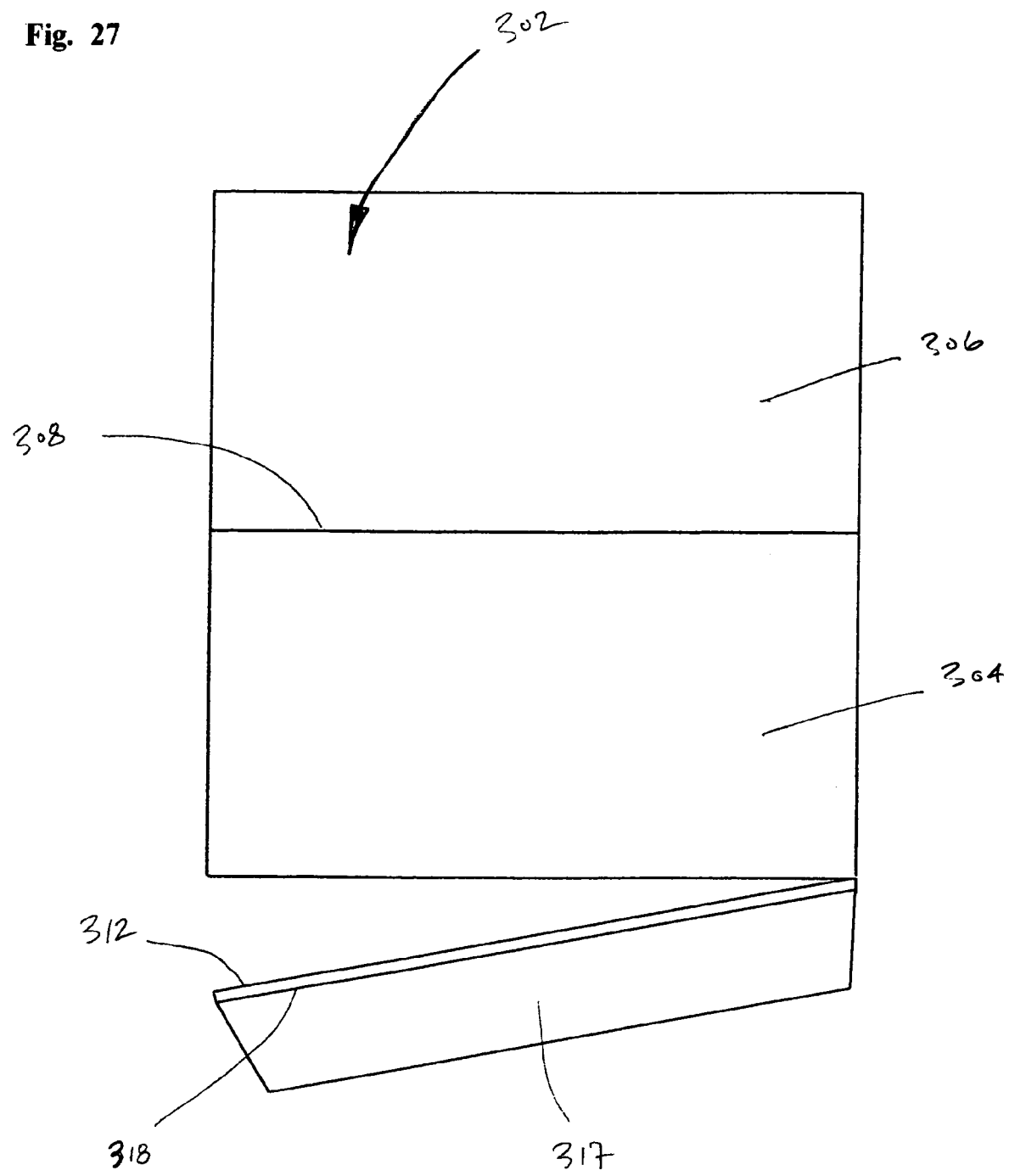
FIG. 27 is a front view of the removable portion of the panel of FIG. 21 completely detached from the envelope in accordance with the present invention.

Referring to FIG. 26 the removable portion 302 of the structure 300 is shown partially removed from the structure 300, which is attached to the envelope 332. Preferably the perforations 320 and 322 of the flap 316 joined to the perforations 310 and 314. That is, it is preferred that the removable portion 302 can be removed in one continuous motion by separating the removable portion 317 of the flap 316 and continuing to separate the first panel 304 from the structure 300. It is contemplated however that the removable portion 317 and the removable portion 302 may be separately removed from the structure 300. In FIG. 27 the removable portion 302 of the structure 300 shown having the removable portion 317 of the flap 316 partially removed therefrom.

Figure 28:
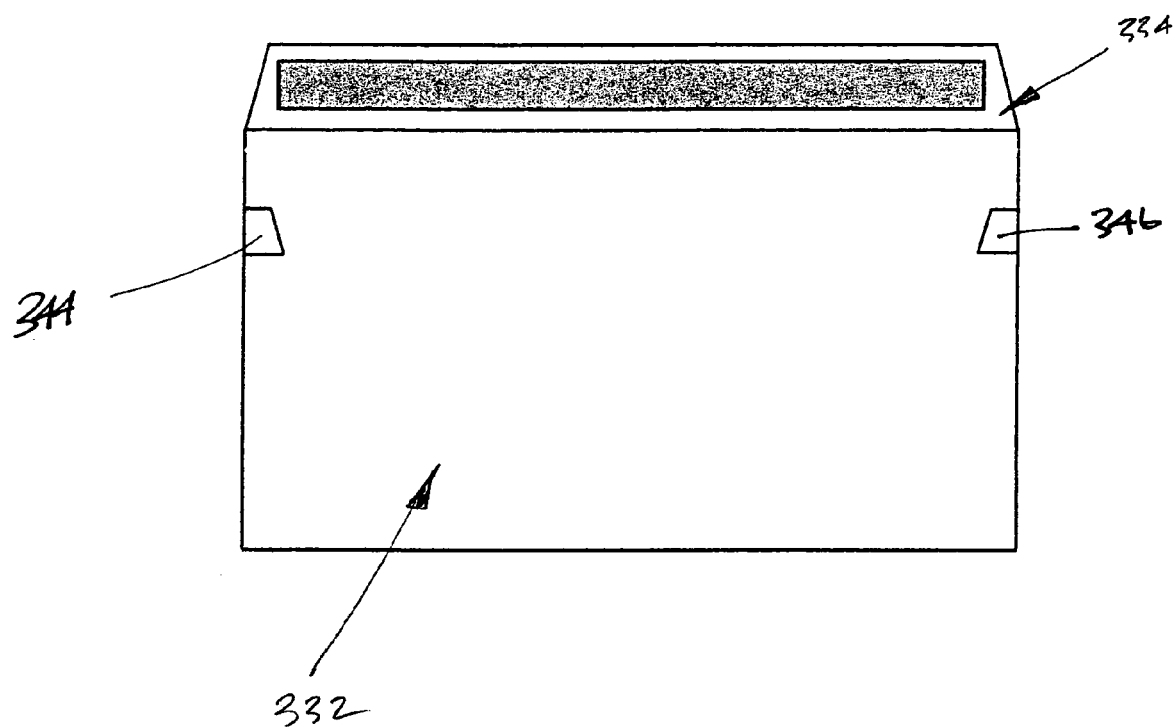
FIG. 28 is a rear view of the reusable envelope of FIG. 25 showing, in particular, a closure flap of the envelope ready for reuse in accordance with the present invention.
Figure 29:
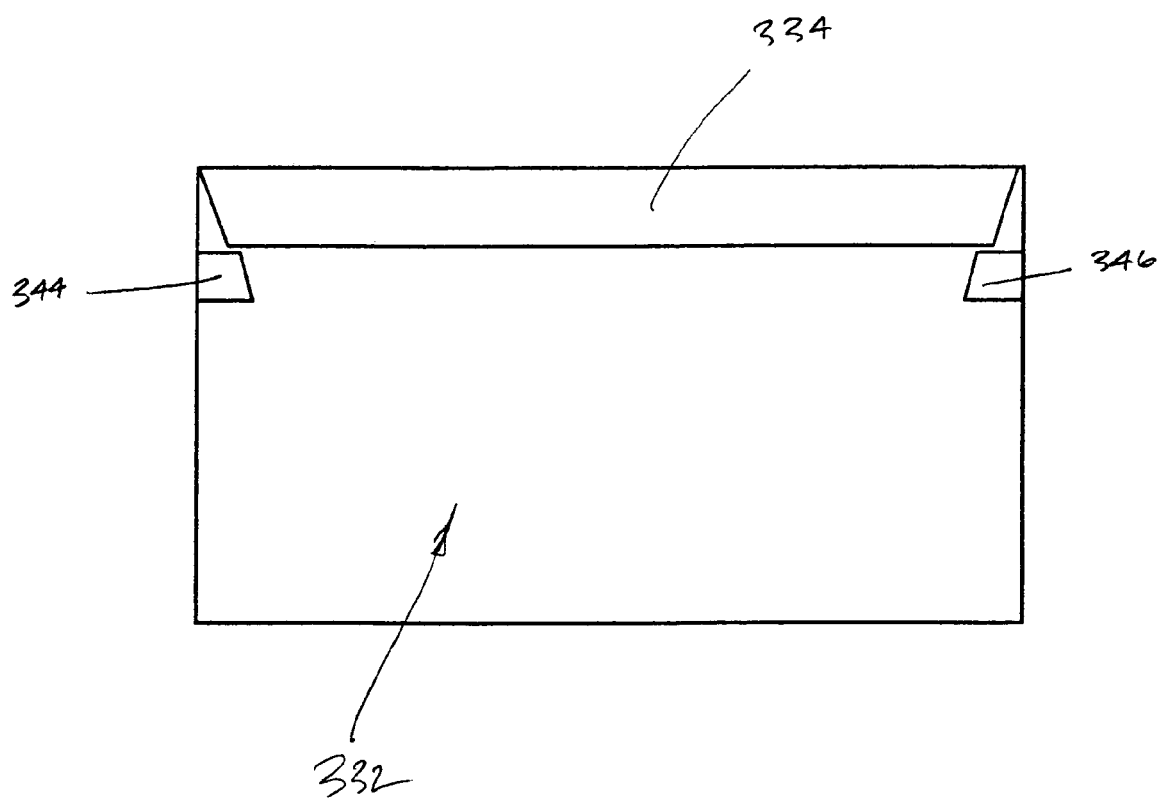
FIG. 29 is a rear view of the reusable envelope of FIG. 28 wherein the closure flap is sealed in accordance with the present invention.

After the removable portion 302 of the structure 300 is removed from the envelope 332 the sealing flap 334 of the envelope may be released by tearing away the portions 340 and 342. The envelope 332 with the sealing flap 334 released is shown in FIG. 28 and is ready to be reused. It is noted that portions 344 and 346 may remain attached to the envelope. Thus, if desired, the removable portion 302 or any other correspondence may be placed in the envelope 332 and may be returned to the sender or any other desired recipient by sealing the envelope 332 as is shown in FIG. 29 with the flap 334. It is contemplated, however, that the envelope 332 does not need to be preaddressed and may be a blank envelope that may be reused appropriately.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A reusable envelope comprising:
    an enclosure having an interior with an access, the enclosure at least partially defined by first and second distinct panels and comprising:
    a first removable panel adjacent to an edge of the enclosure and extending substantially across the length of the enclosure proximal to the edge of the enclosure, the first removable panel including a return address region proximal to a first end of the first removable panel, a postage region proximal to a second end of the first removable panel and opposite the first end, and a central region positioned between the return address region and the postage region;

a first underlying panel underneath the first removable panel, wherein at least a portion of the first underlying panel is exposed when the first removable panel or a portion thereof is removed;

a second removable panel distinct from the first removable panel and corresponding to a second address region;

a second underlying panel underneath the second removable panel. wherein at least a portion of the second underlying panel is exposed when the second removable panel or a portion thereof is removed; and a closure flap, distinct from the first and second removable panels, foldably overhanging the enclosure along a fold line for at least partially sealing the access to the interior, the closure flap comprising a first portion for securing the closure flap a first time and one or more additional portions for securing the closure flap one or more additional times wherein the first portion of the closure flap is separable from the one or more additional portions of the closure flap by a line of weakness.

2. The envelope of claim 1, wherein the second portion of the closure includes one or more access regions for separating the first portion 3. The envelope of claim 1, wherein the first underlying panel is at least partially defined by a panel attached to the first panel of the enclosure and distinct from the first and second panels of the enclosure.

4. The envelope of claim 1, wherein the return address region and the postage region of the first removable panel are separable from each other along a line of weakness.

5. The envelope of claim 1, wherein the second underlying panel is at least partially defined by a panel attached to the first panel of the enclosure and distinct from the first and second panels of the enclosure.

6. The envelope of claim 1, wherein the first end of the first removable panel is positioned proximal to a first side of the enclosure.

7. The envelope of claim 6, wherein the second end of the first removable panel is positioned proximal to a second side of the enclosure opposite the first side of the enclosure.

8. The envelope of claim 7, wherein the first removable portion comprise a rectangular strip.

9. The envelope of claim 8, wherein the rectangular strip comprises a perforation separating the return address region from the postage region.

10. The envelope of claim 9, wherein the perforation is substantially parallel to the first and second sides of the enclosure.

11. The envelope of claim 1, wherein the first removable panel comprises an outgoing address region. from the second portion along the line of weakness.

12. A reusable envelope, the envelope comprising:

an enclosure having an interior with an access, the enclosure at least partially defined by first and second distinct panels and comprising:

a first removable panel adjacent to an edge of the enclosure and extending substantially across the length of the enclosure proximal to the edge of the enclosure, the first removable panel including a return address region proximal to a first end of the first removable panel, a postage region proximal to a second end of the first removable panel and opposite the first end, and a central region positioned between the return address region and the postage region;

a first underlying panel underneath the first removable panel, wherein at least a portion of the first underlying panel is exposed when the first removable panel or a portion thereof is removed;

a second removable panel distinct from the first removable panel and corresponding to a second address region;

a second underlying panel underneath the second removable panel. wherein at least a portion of the second underlying panel is exposed when the second removable panel or a portion thereof is removed; and a reusable sealing flap distinct from the first and second removable panels. the sealing flap foldably overhanging the closure along a fold line and comprising at least: a first portion proximal to the envelope body and extending along the envelope body for a length;

a first adhesive region formed on the first portion of the sealing flap;

a second portion extending from the first portion and distal from the envelope body and extending along a length of the first portion that is less than the length of the first portion and that is separable from the first portion; and a second adhesive region formed on the second portion of the sealing flap;

wherein the adhesive region of the second portion of the sealing flap can be used to seal the envelope a first time such that the second portion of the sealing flap can be separated from the first portion of the sealing flap to open the envelope and the adhesive region on the first portion of the envelope can be used to seal the envelope a second time.

13. The envelope of claim 12, wherein the first adhesive region is spaced apart from the envelope body.

14. The envelope of claim 12, wherein the second adhesive region is spaced apart from the first adhesive region.

15. The envelope of claim 12, wherein the first portion of the sealing flap is separable from the second portion of the sealing flap by a perforation.

16. The envelope of claim 15, wherein the at least one of the first and second adhesive regions is spaced apart from the perforation.

17. The envelope of claim 12, wherein the first portion of the sealing flap comprises a liftable portion that can be used to facilitate the separation of the first portion of the sealing flap from the second portion of the sealing flap to open the envelope when the second portion of the sealing flap is sealed to the body of the envelope.

18. A reusable envelope, the envelope comprising:

an enclosure having an interior with an access, the enclosure at least partially defined by first and second distinct panels and comprising:

a first removable panel adjacent to an edge of the enclosure and extending substantially across the length of the enclosure proximal to the edge of the enclosure, the first removable panel including a return address region proximal to a first end of the first removable panel, a postage region proximal to a second end of the first removable panel and opposite the first end, and a central region positioned between the return address region and the postage region;

a first underlying panel underneath the first removable panel, wherein at least a portion of the first underlying panel is exposed when the first removable panel or a portion thereof is removed;

a second removable panel distinct from the first removable panel and corresponding to a second address region;

a second underlying panel underneath the second removable panel, wherein at least a portion of the second underlying panel is exposed when the second removable panel or a portion thereof is removed; and a reusable sealing flap distinct from the first and second removable panels, the sealing flap foldably overhanging the enclosure along a fold line and comprising at least:
   a first portion proximal to the envelope body and extending along the envelope body for a length;
   a second portion extending from the first portion and distal from the envelope body and extending along a length of the first portion that is less than the length of the first portion; and
   at least one adhesive region formed on the sealing flap and spaced apart from a boundary along which the first portion can be separated from the second portion of the sealing flap;
wherein the at least one adhesive region of the sealing flap can be used to seal the envelope a first time such that the second portion of the sealing flap can be separated from the first portion of the sealing flap to open the envelope and the first portion of the envelope can be used to close the envelope a second time.

\* \* \* \* \*

UNITED STATES PATENT AND TRADEMARK OFFICE
CERTIFICATE OF CORRECTION

PATENT NO. : 7,549,571 B2  Page 1 of 1
APPLICATION NO. : 10/632489
DATED : June 23, 2009
INVENTOR(S) : Carol A. DeLaVergne It is certified that error appears in the above-identified patent and that said Letters Patent is hereby corrected as shown below:

Column 13,
Claim 1, Line 8, please delete "panel." and insert in place thereof, --panel,--.

Column 13,
Claim 2, Line 22, please delete "first portion" and insert in place thereof, --portion from the second portion along the line of weakness.--.

Column 13,
Claim 11, Lines 49 and 50, please delete "from the second portion along the line of weakness.".

Column 14,
Claim 12, Line 4, please delete "panel." and insert in place thereof, --panel,--.

Column 14,
Claim 12, Line 10, please delete "closure" and insert in place thereof, --enclosure--.

Signed and Sealed this

Eleventh Day of August, 2009

David J. Kappos
*Director of the United States Patent and Trademark Office*